(12) United States Patent
Collins

(10) Patent No.: US 6,491,057 B1
(45) Date of Patent: Dec. 10, 2002

(54) METHOD AND DEVICE FOR INSTALLING AN AIR TAP ONTO A PRESSURIZED AIR PIPE

(75) Inventor: James Collins, Mooresville, NC (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/631,369

(22) Filed: Aug. 2, 2000

Related U.S. Application Data

(60) Provisional application No. 60/193,456, filed on Mar. 31, 2000.

(51) Int. Cl.[7] .............................................. F16K 43/00
(52) U.S. Cl. ..................... 137/318; 137/15.14; 408/67
(58) Field of Search ........................... 137/15.13, 15.14, 137/318; 408/67, 92, 97, 101, 111, 137

(56) References Cited

U.S. PATENT DOCUMENTS

| | | | | |
|---|---|---|---|---|
| 460,773 A | * | 10/1891 | Eley ............................ 137/318 |
| 485,716 A | * | 11/1892 | Smith .......................... 137/318 |
| 527,877 A | * | 10/1894 | O'Neil ........................ 137/318 |
| 2,115,992 A | * | 5/1938 | Oppl ........................... 137/318 |
| 2,291,979 A | | 8/1942 | Mueller et al. |
| 2,527,968 A | * | 10/1950 | Sherman et al. .............. 408/67 |
| 2,601,434 A | * | 6/1952 | DuBois ........................ 137/318 |
| 2,767,600 A | * | 10/1956 | Mueller et al. ............... 137/318 |
| 2,800,812 A | * | 7/1957 | Mueller et al. ............... 408/67 |
| 2,972,915 A | * | 2/1961 | Milanovits et al. .......... 137/318 |
| 3,162,211 A | * | 12/1964 | Barusch ....................... 137/318 |
| 3,460,721 A | * | 8/1969 | Hamel et al. ................ 137/318 |
| 3,554,217 A | * | 1/1971 | Ehrens et al. ................ 137/318 |
| 3,773,067 A | * | 11/1973 | Ray ............................. 137/318 |
| 3,799,182 A | * | 3/1974 | Long ............................ 137/318 |
| 3,821,965 A | * | 7/1974 | Reynolds ..................... 137/318 |
| 3,905,718 A | * | 9/1975 | Luckenbill et al. .......... 408/111 |
| 3,948,282 A | * | 4/1976 | Yano ........................... 137/318 |
| 4,540,011 A | * | 9/1985 | Croxford et al. ............ 137/318 |
| 4,730,636 A | * | 3/1988 | Volgstadt et al. ............ 137/318 |
| 5,033,917 A | * | 7/1991 | McGlasson et al. ......... 408/67 |
| 5,074,526 A | * | 12/1991 | Ragsdale et al. ............ 137/318 |
| 5,105,844 A | * | 4/1992 | King, Sr. ..................... 137/318 |
| 5,332,343 A | * | 7/1994 | Watanabe et al. ........... 409/136 |
| 5,694,972 A | * | 12/1997 | King ............................ 137/318 |
| 5,772,367 A | * | 6/1998 | Daniel .......................... 408/67 |
| 5,893,686 A | * | 4/1999 | Weiler .......................... 408/97 |
| 5,964,240 A | * | 10/1999 | Granovski ................... 137/318 |
| 6,086,292 A | * | 7/2000 | Yokoyama ................... 408/67 |

* cited by examiner

Primary Examiner—George L. Walton
(74) Attorney, Agent, or Firm—Michael Best & Friedrich LLP

(57) ABSTRACT

An apparatus and method are provided for installing a fluid tap onto a pipe or conduit containing pressurized fluid. Debris generated by cutting a coupon from a pressurized fluid conduit is directed though the apparatus and prevented from entering the conduit. The apparatus can be removed from the newly installed air tap and reused. According to the method, pressurized fluid from the pressurized fluid system is used to wash debris generated from the coupon-cutting operation through the apparatus along a flow path that includes a collection chamber and filter. A kit is also provided and includes the apparatus and a variety of interchangeable connectors and cutting tools to allow the apparatus to be quickly configured for a wide variety of tap, valve, and pipe sizes.

42 Claims, 18 Drawing Sheets

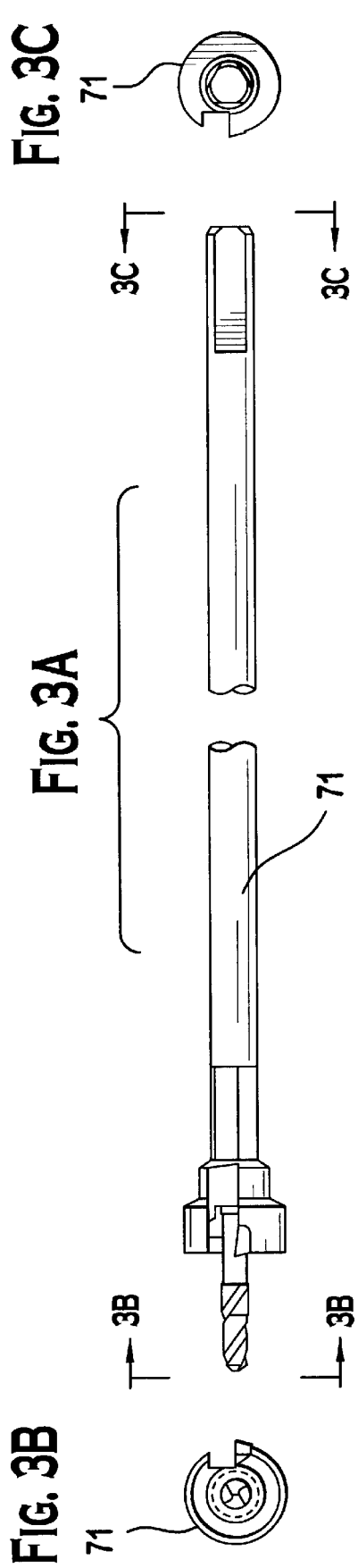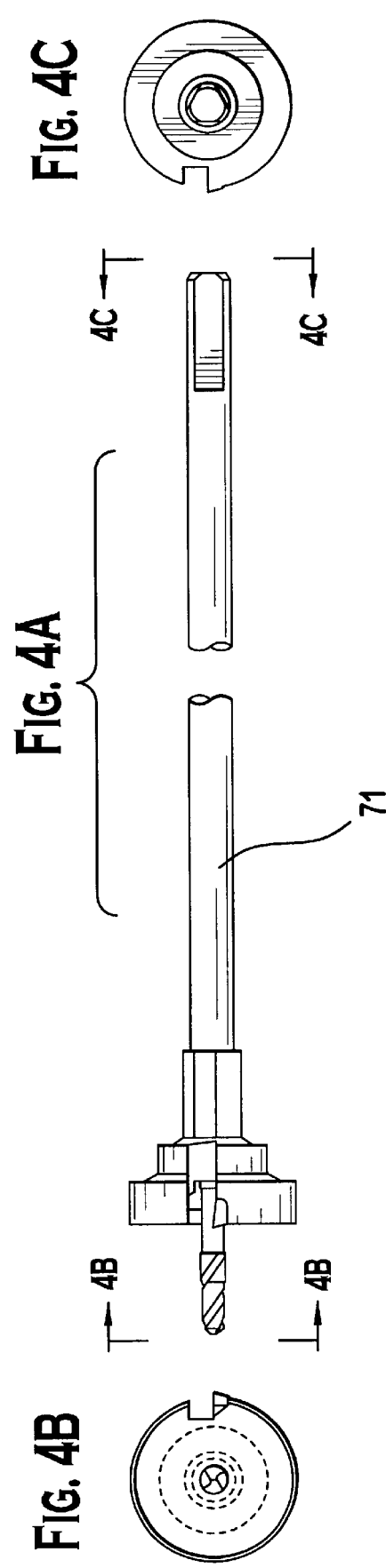

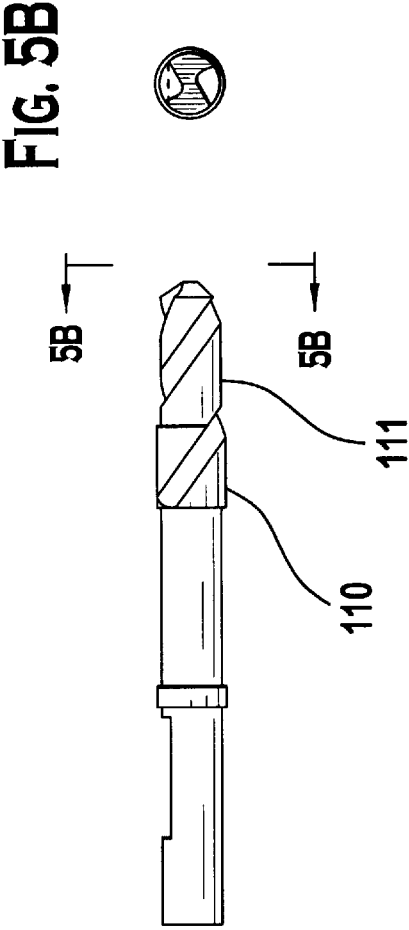

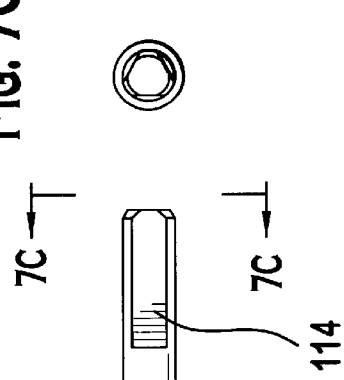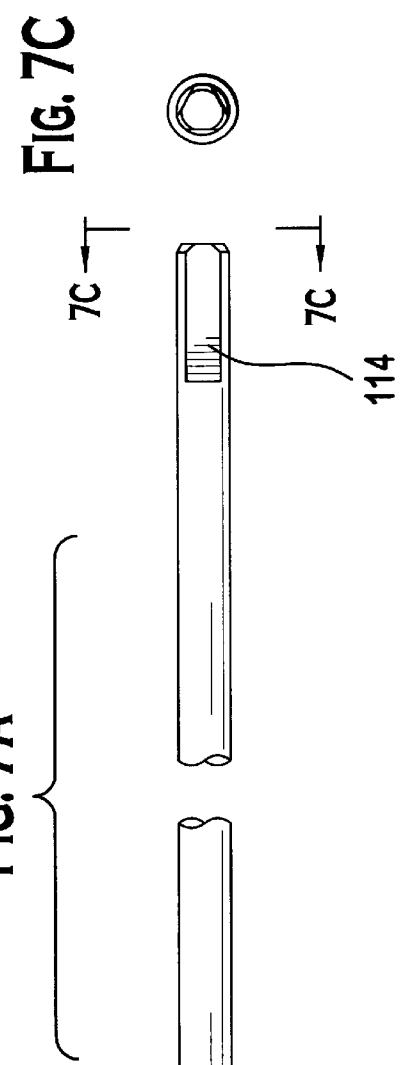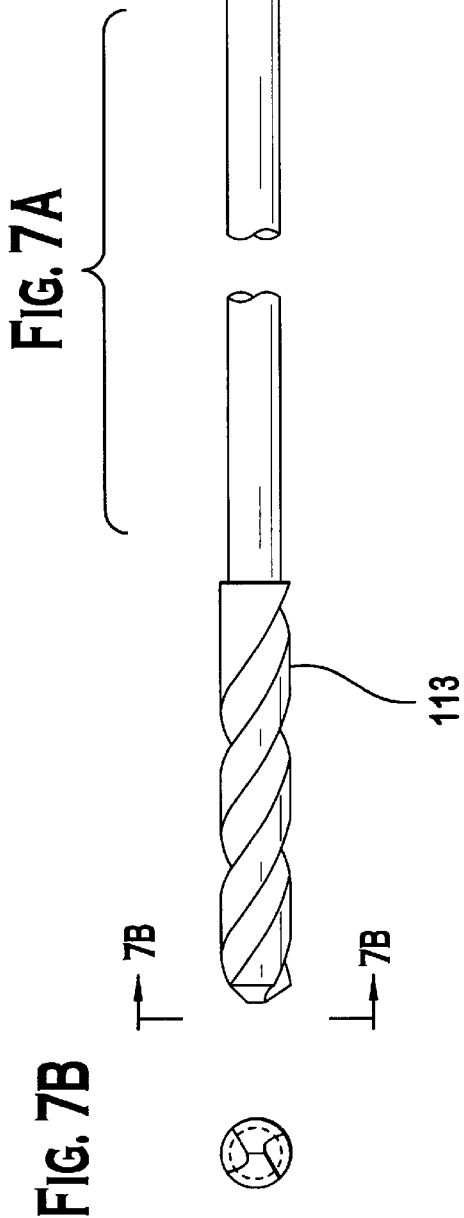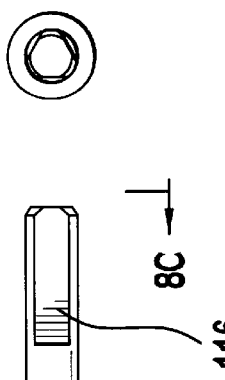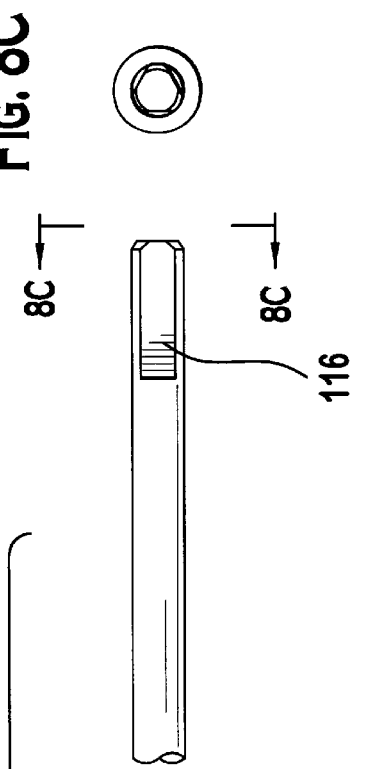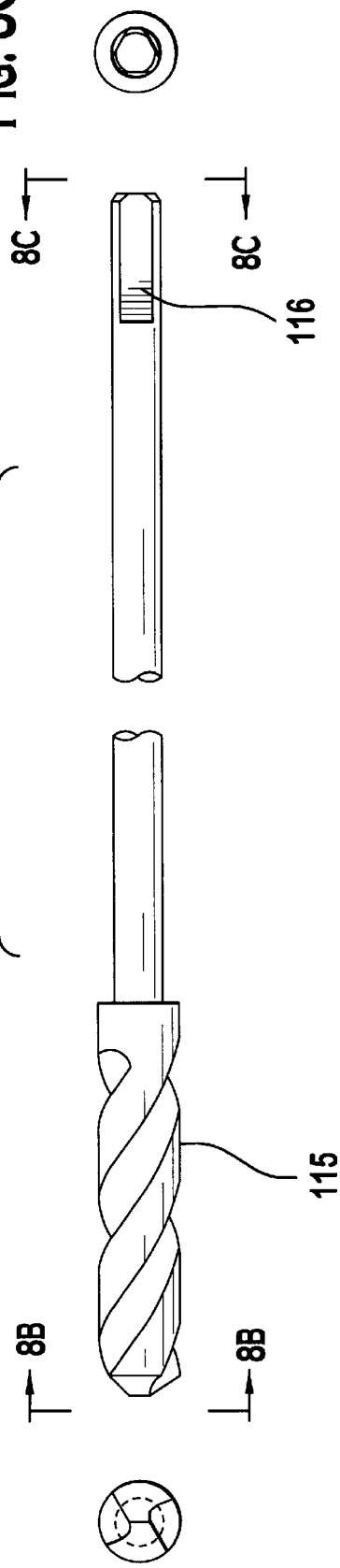

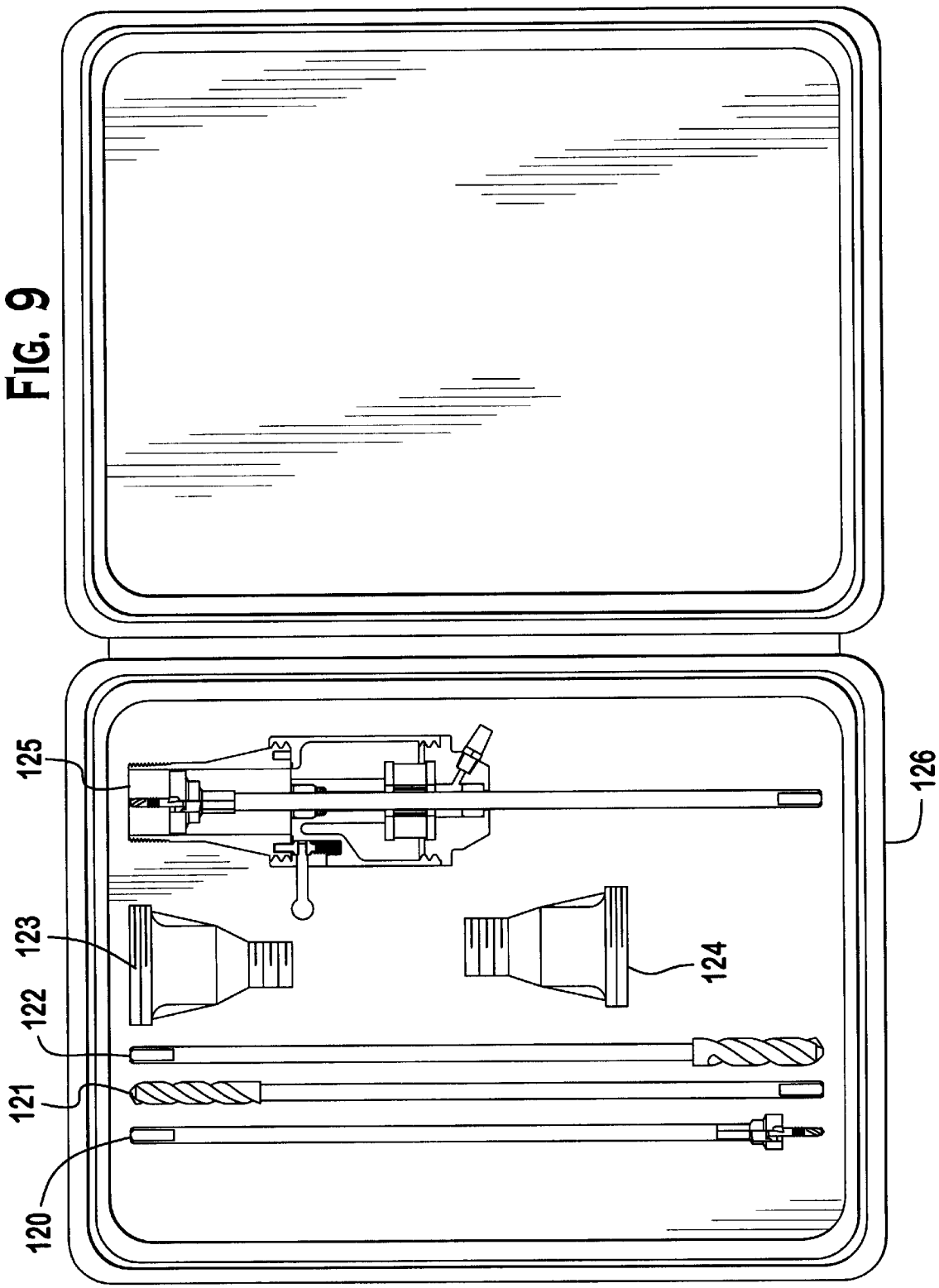

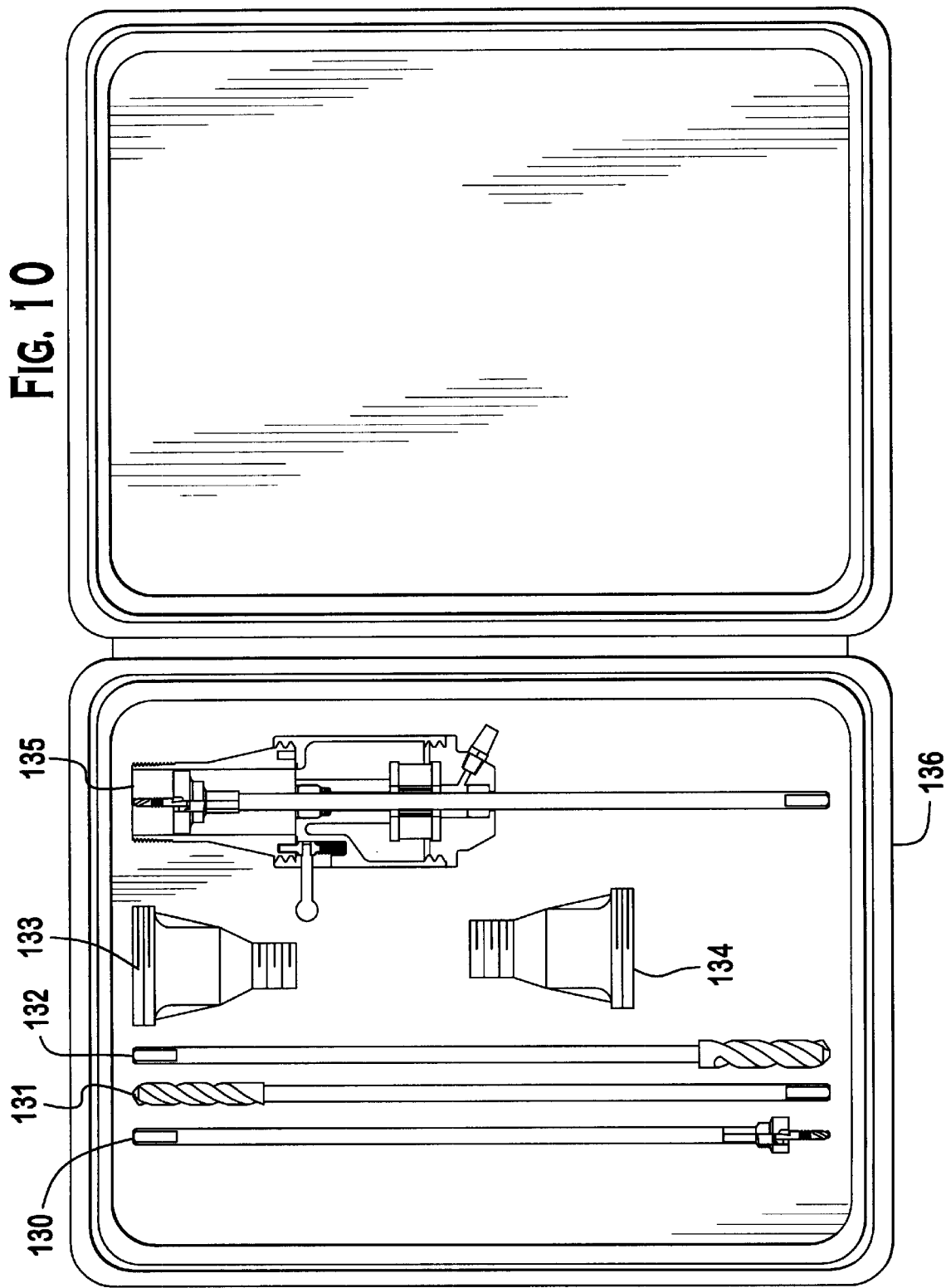

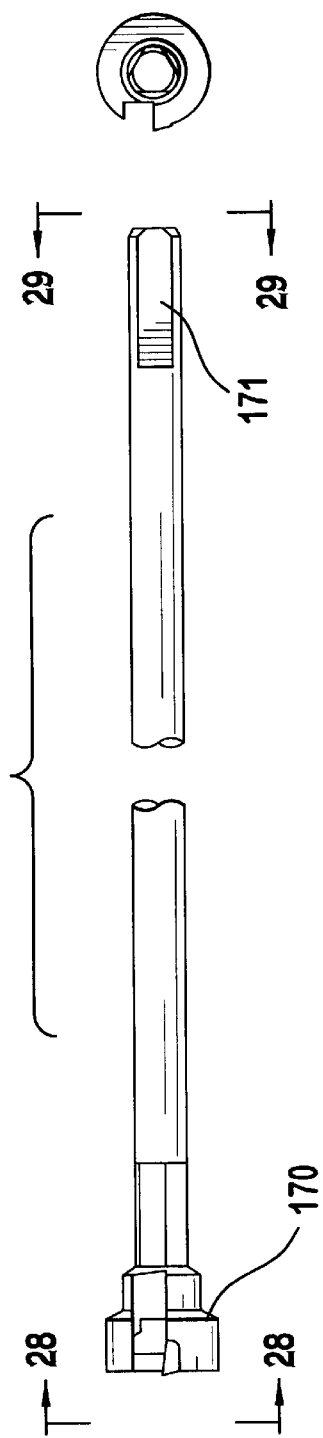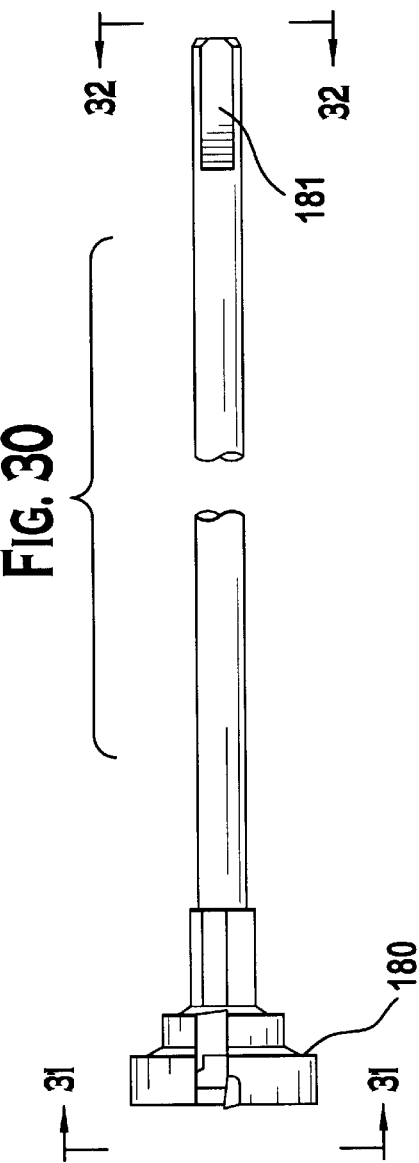

METHOD AND DEVICE FOR INSTALLING AN AIR TAP ONTO A PRESSURIZED AIR PIPE

CROSS REFERENCE TO RELATED APPLICATION

This application claims the benefit under 35 U.S.C. §119 (e) of prior U.S. Provisional Application No. 60/193,456 entitled "Method and Device for Installing an Air Tap onto a Pressurized Air Pipe" filed Mar. 31, 2000, which is incorporated herein in its entirety by reference.

BACKGROUND OF THE INVENTION

The present invention relates to an apparatus and method for installing an air tap onto a pipe containing pressurized fluid.

When compressed fluid systems such as compressed air systems have been in service and require modification, such as tapping an additional pipe onto an existing pipe, conventional methods typically require that a section of the pipe being worked must be isolated or the entire compressed fluid system must be shutdown and depressurized before an air tap is added. As a result, any equipment or processes depending on the compressed fluid must be taken out of service or shifted to an alternate supply. In addition, any cuttings and debris generated by cutting the existing pipe often enter the pipework, contaminating the fluid system and causing potential problems to filters, tools, and other equipment.

U.S. Pat. No. 5,964,240 to Granovski relates to a pipe tapping device for attaching a branch device to a main pipeline without disconnecting or interrupting the flow through the main pipeline. The apparatus is used for only a single application and the saddle, valve, and cutting tool of the device constitute an integral assembly that becomes a permanent part of the system onto which the apparatus is installed.

A need exists for a pipe tapping system that can use an off-the-shelf saddle and valve which become a permanent part of the compressed fluid system without the need to permanently include the tapping or cutting tool in the system.

A need further exists for a reusable pressurized fluid pipe tapping apparatus that can be used many times and thus is less expensive to use than tapping or cutting tools that can only be used one time.

SUMMARY OF THE INVENTION

The present invention provides an apparatus and method for connecting a pipe for an ancillary device or system to the outside wall of an existing pipe by using a fitting and valve connection. According to the present invention, a saddle or connecting plate is mounted to an existing pipe and a flow valve is connected to the connecting plate and set to an open position. The tapping apparatus of the present invention is connected to the valve and includes a cutting bit that extends though the valve, through the connection plate, and contacts the existing pipe where it cuts a coupon from the existing pipe and catches the coupon. After the coupon is cut from the side wall of the existing pipe, the coupon and cutting bit are removed from the valve and the valve can be closed to facilitate removal of the tapping device from the valve. The tapping device including the cutting bit can then be disconnected from the valve and removed to be used again.

The design of the tapping apparatus provides for the collection of cutting debris in a chamber in the apparatus and prevents the debris from entering the compressed air system being tapped. Energy from the compressed air in the pipe system is used to wash the debris through the apparatus along a flow path having a chamber design. A filter is provided within the tapping apparatus to trap cuttings and finer debris yet allow air to purge from the apparatus. Compressed fluid flowing through the apparatus exits the apparatus through a miniature muffler.

The apparatus can be provided in a kit according to the present invention which includes interchangeable adapters, connectors, and cutting tools to quickly configure the apparatus for a wide variety of tap and pipe sizes.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several exemplary embodiments of the present invention and together with description, serve to explain the principles of the present invention.

BRIEF DESCRIPTION OF THE DRAWINGS

The invention may be more fully understood with reference to the accompanying figures. The figures are intended to illustrate exemplary embodiments of the present invention without limiting the scope of the invention.

FIG. 3A is a plan view of a $13/16$ inch drill bit useful in an apparatus according to an embodiment of the present invention;

FIG. 3B is an end view of the drill bit 71 taken along line 3B—3B of FIG. 3A;

FIG. 3C is an end view of drill bit 71 taken along line 3C—3C of FIG. 3A;

FIG. 4A is a plan view of a 1 and $7/16$ inch cutting bit useful in an apparatus according to an embodiment of the present invention;

FIG. 4B is an end view of the drill bit taken along line 4B—4B of FIG. 4A;

FIG. 4C is an end view of the drill bit taken along line 4C—4C of FIG. 4A;

FIG. 5A is a plan view of a $3/16$ inch pilot drill bit having a coupon catch design and useful in the apparatus according to the present invention;

FIG. 5B is an end view of the pilot bit taken along line 5B—5B of FIG. 5A;

FIG. 6 is a plan view of the pilot bit shown in FIGS. 5A and 5B and shows the various dimensions of the pilot bit;

FIG. 7A is a plan view of a ½ inch twist drill bit shown in partial breakaway and suitable for use in an apparatus according to the present invention;

FIG. 7B is an end view of the twist drill bit taken along line 7B—7B of FIG. 7A;

FIG. 7C is an end view of the twist drill bit taken along line 7C—7C of FIG. 7A;

FIG. 8A is a ⅝ inch twist drill bit shown in breakaway view, that can be used in an apparatus according to an embodiment of the present invention;

FIG. 8B is an end view of the twist drill bit taken along line 8B—8B of FIG. 8A;

FIG. 8C is an end view taken along line 8C—8C of FIG. 8A;

FIG. 9 is a plan view of a tap kit according to an embodiment of the present invention;

FIG. 10 is a plan view of a tap kit according to an embodiment of the present invention;

FIG. 27 is a plan view of a drill bit including a cutting bit without a pilot bit, shown in breakaway view, useful in an apparatus according to an embodiment of the present invention;

FIG. 28 is an end view taken along line 28—28 of FIG. 27;

FIG. 29 is an end view taken along line 29—29 of FIG. 27;

FIG. 30 is a plan view of a drill bit including a cutting bit without a pilot bit, shown in breakaway view, useful in an apparatus according to an embodiment of the present invention;

FIG. 31 is an end view taken along line 31—31 of FIG. 30;

FIG. 32 is an end view taken along line 32—32 of FIG. 30;

DETAILED DESCRIPTION

Figure 1:
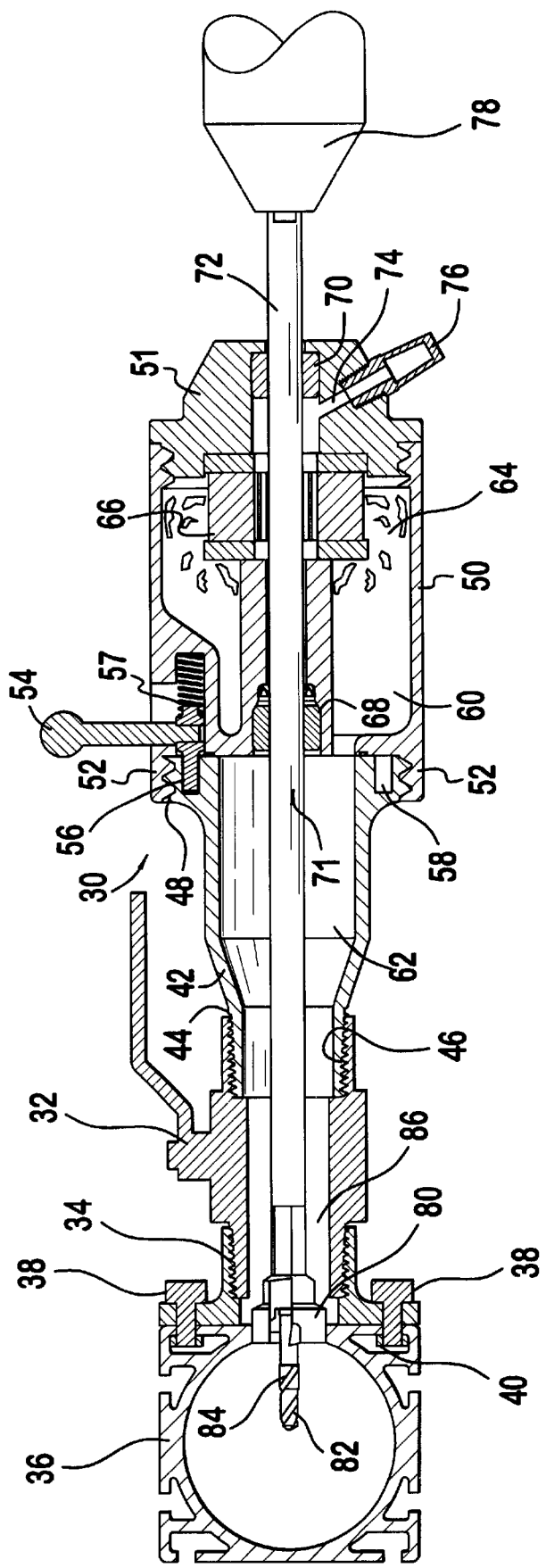
FIG. 1 is a cross-sectional side view of a tapping tool of the present invention operatively connected to a valve, which in turn is connected to a connection plate, which in turn in mounted on a pipe to be tapped.

According to the present invention, a tapping tool is provided for tapping a pressurized fluid from within an existing conduit to an ancillary device. The tapping tool includes a tool body having opposing ends, at least one of the ends having an opening, an interior cavity, and at least one shaft mounting means or device, such as a bearing or bushing. The shaft mounting means rotatably mounts a shaft of a hole cutting means, such as a drill bit, in a fixed axis of rotation with respect to the tool body while allowing sliding movement of the shaft along the axis of rotation. The tapping tool also includes a hole cutting means or device, such as a drill bit, having a shaft and a cutting bit at one end of the shaft. The shaft preferably has a diameter such that the shaft fits in the at least one shaft mounting means for rotation about the fixed axis of rotation. The shaft preferably has a length sufficient to allow the cutting bit to extend through the opening in the tool body and remain mounted by the at least one shaft mounting means when the hole cutting means is operatively positioned within the tool body. The tapping tool of the present invention may also preferably include a driving means or device, such as a drill, connected to an end of the shaft of the hole cutting means opposite the end of the shaft having the cutting bit.

According to some embodiments of the present invention, the tapping tool may also include a connecting means, such as a connector or nipple, that has an interior cavity and opposing ends, wherein one end of the connecting means has connection means or a connecting device, such as threads, for connecting to the end of the tool body having the opening. The opposite end of the connecting means may also have connection means or a connecting device, such as threads, for connecting to an end of a valve means, such as a full flow ball valve. In embodiments wherein the connecting means is connected to the tool body, the shaft of the hole cutting means preferably has a length sufficient to allow the cutting bit to extend through the connecting means while the shaft remains mounted by the at least one shaft mounting means and the hole cutting means is operatively positioned within the tool body.

The tapping tool of the present invention, when in operative position, may further includes a removable valve means, such as a full flow ball valve, connected to the end of the tool body having the opening. The tapping tool can also include a removable valve mounting means, such as a saddle, connecting plate, or other connector connected to the valve means for mounting the valve means to an existing conduit of a pressurized fluid system. The cutting bit in such an embodiment preferably extends through the valve means and through the valve mounting means in operation, to reach the existing pipe or conduit onto which the valve mounting means is secured.

In embodiments wherein a tool body connecting means is also included, the valve means may be removably connected to the connecting means at a first end of the connecting means. The connecting means preferably also has an interior cavity and a second end opposite the first end. The second end of the connecting means is connected to the end of the tool body having the opening. When the driving means is actuated, the shaft can be slid through the shaft mounting means such that the cutting bit extends through said connecting means, through the valve means, through the valve mounting means, and into contact with the existing conduit to cut a coupon out of the existing conduit. When the cutting bit pierces the existing conduit, pressurized fluid from the conduit flows through the valve mounting means, through the valve means, through the connecting means, through the interior cavity of the tool body, and out an exhaust means, such as an exhaust port formed in the tool body.

The tapping tool preferably includes exhaust means communicating the interior cavity of the tool body with the surrounding atmosphere. Preferably, the interior cavity is designed to permit the flow of pressurized fluid through the opening, through the interior cavity, and out the exhaust means. The interior cavity is preferably substantially air-tight from the opening to the exhaust means, and a filter is preferably provided in the interior cavity for filtering pressurized fluid flowing through the tool body and out the exhaust means.

The present invention also provides a kit that includes the tapping tool and at least a second hole cutting means that is different from the first hole cutting means included with the tool. Preferably, the kit also includes at least two connecting means that differ from one another.

The present invention also includes a method for tapping a pressurized fluid from within a conduit to an ancillary device. The method includes mounting a first end of a valve means to a pressurized fluid conduit. The valve means has a first end, a second end, and a through hole extending from the first end to the second end when the valve means is in an open position. The valve means is actuated to an open position if not mounted in an open position. Mounting the valve means may include mounting a valve mounting means such as connection plate or saddle on a pipe or conduit and connecting the valve means to the valve mounting means before or after mounting the mounting means.

A tapping tool according to the present invention is removably connected such that the end of the tool body having the opening is connected to a second end of the valve means. A driving means such as a drill is connected to the driving head of the shaft of the hole cutting means. The cutting bit of the hole cutting means is then extended through the valve means and into cutting contact with the conduit. A hole is then cut by the hole cutting means in the existing conduit. Then, the hole cutting means is withdrawn from the valve means. The valve means is then closed after the hole cutting means is withdrawn. Afterwards, the tapping tool can be disconnected from the second end of the valve means.

The tapping tool may also include a pilot bit integral with or removably secured or mounted on the end of the hole cutting means that includes the cutting bit. The pilot bit preferably pilots the cutting bit and rotates on the same axis of rotation as the cutting bit. The method preferably includes first cutting a pilot hole with the pilot bit and then cutting a coupon with the cutting bit, wherein the pilot bit includes a catch that retains the coupon after it is cut with the cutting bit and during withdrawal of the cutting bit from the valve means. Pressurized fluid from the pressurized fluid conduit forces debris and cuttings from the cutting operation through the valve means and into the interior cavity of the tool body. The tool body may further include an exhaust means, such as an exhaust port, communicating the interior cavity with the surrounding atmosphere, and the flow of pressurized fluid flows through the interior cavity and out the exhaust means. The interior cavity is substantially air-tight from the first opening to the exhaust means, and a filter is provided in the interior cavity for filtering pressurized fluid flowing through the tool body and out the exhaust means.

The end cap on the tool body facilitates cleaning cutting debris from the interior cavity of the body and enables replacement of the filter. In this regard, the cap for the tool body is preferably installed using a stainless steel anti-seize lubricant on the threads to avoid galling and damage to the stainless steel threads. Bearings, bushings, and seals can also be replaced as necessary by periodically taking apart the various tool components.

A properly sized drill bit or cutting bit can be installed by sliding the shaft of the bit through the front of the tool until the cutting end is withdrawn into the tool body or a connector for the tool body. Various driving means, including a ⅜ inch chuck or larger drill, can preferably be used to operate the tool.

An exemplary operation begins by installing a connecting plate onto an existing conduit or pipe and tightening the plate to the conduit. Preferably, a valve, such as a full flow ball valve, is then installed onto the connecting plate that is already mounted on the existing conduit. Thread sealant and adequate torque should be used to tighten the valve and connecting plate as these components will remain a permanent part of the system. The tapping tool of the present invention is threaded into the exposed end of the valve, that is, the end of the valve opposite the end secured to the connecting plate. The valve is set to an open position and the cutting bit is slid through the tapping tool until it touches the wall of the pipe. A variable speed drill, for example, a drill having a ⅜ inch chuck or larger, is then attached to the cutting bit and drilling is performed at a proper speed. When the pipe is cut through, cutting debris is collected into the tool body and if a coupon blank is made, the coupon is preferably trapped on the pilot drill bit. Then, the cutting bit is carefully retracted through the valve so as to not damage the valve or shake any remaining debris into the system. The valve is then closed.

After the ball valve is closed, the tapping tool is preferably slowly removed from the valve by disengaging the threads. Each connector or attachment nipple preferably has a small slot cut into an end of the pipe threads which acts as a safety pressure relief and whistles to alert the user of pressure and to relieve the pressure. If pressure begins to relieve in this way, removal of the tool should be stopped until all pressure is relieved. After ensuring that the valve is fully closed and the safe removal of the tapping tool is completed, the tool can be disassembled, cleaned, and components can be replaced if necessary. After tool removal, a new pipe or conduit can then be installed onto the newly installed valve.

Referring now to the drawing figures, the abbreviation NPT is for National Pipe Thread standard and the abbreviation BSPT is for British Pipe Thread Tapered. FIG. 1 shows a tapping tool 30 according to an embodiment of the present invention operatively connected to a flow valve 32, which in turn is threadably engaged to a mounting plate 34 which has been secured to a pipe 36. The pipe may be of the type described in U.S. Pat. No. 5,938,245, which is incorporated herein in its entirety by reference. The flow valve can be a full flow ball valve, for instance, a PARKER ball valve. The connection plate 34 is secured to the pipe 36 by bolts 38 and nuts 40 in the embodiment shown. The tapping tool 30 according to the present invention includes a quick change connector 42 having at an end thereof threads 44 that engage threads 46 of the flow valve 32. The opposite end of the quick change connector 42 is provided with threads 48 that engage tap body 50 at threads 52. An anti-rotation lock 54 is provided to prevent the rotation of body 50 relative to the quick change connector 42. The anti-rotation lock 54 is provided with a pin 56 and is spring biased by a spring 57, such that pin 56 is normally biased into one of a plurality of pin receiving holes 58 formed in the quick change connector 42. Tap body 50 has a flow through cavity 60 formed therein that is in communication with a cavity 62 in the interior of quick change connector 42. Cavity 60 in tap body 50 is provided with a chip collection chamber 64. Chip collection chamber 64 is adjacent a filter 66, as shown. Tap body 50 is provided with bearings 68 at one end thereof and bearings 70 at an opposite end thereof. Bearings 68 and 70 assure a very precise alignment of a drill shaft 72 of drill bit 71 that passes through the tap body 50 and is guided and rotatably secured by bearings 68 and 70. Preferably, bearings 68 and 70 comprise a durable, low friction material and can be ball bearings, rail bearings, rod bearings, polytetrafluoroethylene bearings, or other bearings conventional to those skilled in the art. The bearings are preferably interference fit within the tap body 50. Adjacent bearing 70 in tap body 50 is an exhaust port 74 for exhausting pressurized gas forced through the tap body 50 by the pressure of compressed air or fluid passing through pipe 36. Exhaust port 74 leads to a muffler or silencer 76 from which pressurized air, other gas, or fluid can be exhausted from tap body 50.

At a first end of drill shaft 72, the shaft 72 is connected to a power drill 78, for example, any conventional power drill having a drive suitable for accommodating the drill shaft 72. At an end of drill shaft 72 opposite the power drill 78, a cutting bit 80 is provided, for example, a carbide hole cutter bit. Axially centered with respect to the cutting bit 80 is a pilot drill bit 82 that includes a coupon catch 84 for catching a coupon resulting from a hole cutting operation with bit 80. The coupon catch 84 assures that the coupon is not lost into a pressurized fluid system to which pipe 36 is connected. Hole cutting bit 80 is preferably provided with a design that guides or forces cuttings from a hole cutting operation into a cavity 86 formed internally of the connection plate 34 and flow valve 32.

Figure 2:
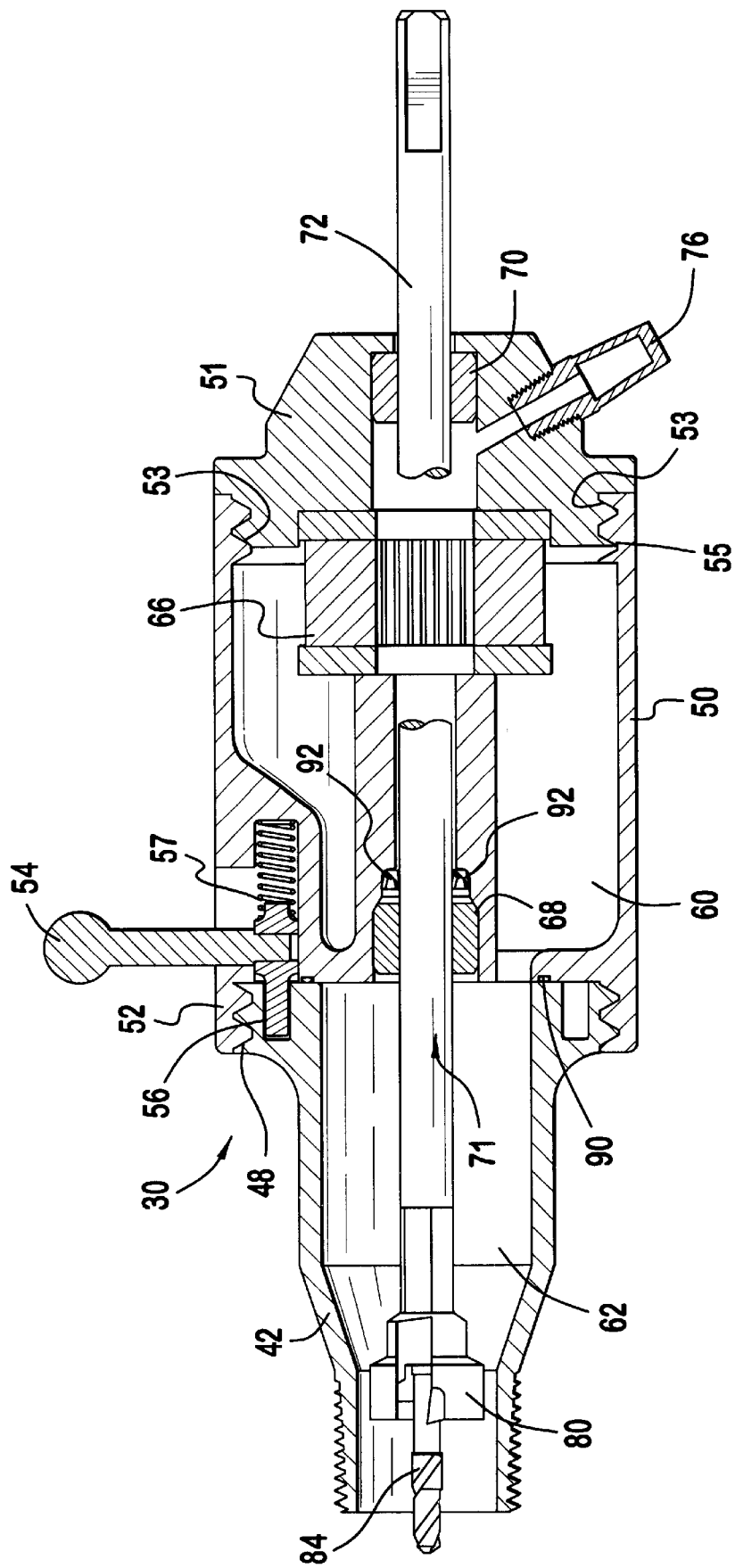
FIG. 2 is a cross-sectional view of a tapping tool according to an embodiment of the present invention.

In the embodiment shown in FIGS. 1 and 2, tap body 50 is provided with and includes an end cap 51 having threads 53 that threadably engage the tap body proper 50 at threads 55.

As shown in FIG. 2, an O-ring 90 is provided between the tap body 50 and the quick change connector 42 to provide an air-tight seal at the connection of the two components. A seal 92 is also provided adjacent bearing 68 to prevent the escape of pressurized fluid from the tap body along drill shaft 72. The seal 92 and the O ring 90 preferably comprise a rubber or other elastomeric or resilient material, for example, a carboxylated nitrile material.

In operation, a connecting plate 34 is mounted to a pipe 36 to be tapped. O-rings, seals, gaskets, or other insulating material and/or means can be provided between the connection plate 34 and pipe 36 to provide an air-tight seal therebetween. A flow valve 32 is connected to the connection plate 34 before or after the connection plate 34 is secured to the pipe 36. Threading compound, sealing tape, or other sealing material and/or means are preferably provided at the point of engagement between the flow valve 32 and the connection plate 34. According to the embodiment shown in FIG. 1, a sealing compound is provided where the threads of flow valve 32 engage the threads of connection plate 34. The quick change connector 42 is threadably engaged at threads 44 to threads 46 of the flow valve 32, before or after the flow valve 32 is engaged with connection plate 34. The tap body 50, including end cap 51, is engaged with the connector 42, and the anti-rotation lock 54 is engaged in an appropriate pin receiving hole 58. Tap body 50 is preferably threadably engaged to the quick change connector 42 after connector 42 is engaged to the flow valve 32. The device is ready for operation.

As drill 78 actuates drill shaft 72 to spin the cutting bit 80 and pilot bit 82, pilot bit 82 begins to drill through the side wall of pipe 36. Due to the shape of the grooved channels formed in pilot bit 82, cuttings from drilling with the pilot bit are generally directed in a direction opposite the direction of drilling, that is, away from pipe 36. Once the pilot drill bit 82 pierces the side wall of pipe 36, compressed or pressurized fluid traveling through pipe 36 begins to seep through the newly formed pilot drill bit hole causing the further carrying way of cuttings and debris in a direction opposite the direction of drilling. Pressurized fluid seeping through the newly formed hole passes through cavity 86, through cavity 62, into cavity 60, through filter 66, through exit port 74, and out the muffler or silencer 76. Large chips or chunks of debris are collected in the chip collection chamber 64 whereas smaller debris may be trapped by filter 66.

After the pilot drill bit 82 penetrates the side wall of pipe 36, hole cutting bit 80 begins to abrade or cut the side wall of pipe 36. Debris resulting from the hole cutting operation using bit 80 passes along with the flow of pressurized fluid through cavity 86, through cavity 62, through cavity 60, and is trapped in either chip collection chamber 64 or by filter 66 while the pressurized fluid escapes the tapping tool 30 through exhaust port 74 and muffler or silencer 76.

FIG. 3A is a plan view of a 13/16 inch drill bit according to an embodiment of the present invention. The shaft of the bit is preferably made of a hardened metal such as hardened or stainless steel, and the cutting tip may preferably be a carbide cutting tip. FIG. 3B is an end view of the drill bit 71 of FIG. 3A taken along line 3B—3B, and FIG. 3C is an end view of drill bit 71 taken along line 3C—3C of FIG. 3A.

FIG. 4A is a plan view of a 1 and 7/16 inch cutting bit used in according to an embodiment of the present invention. The shaft of the bit is preferably made of a hardened metal such as hardened or stainless steel, and the cutting tip may preferably be a carbide cutting tip. FIG. 4B is an end view of the drill bit of FIG. 4A taken along line 4B—4B and FIG. 4C is an end view of the drill bit 71 of FIG. 4A taken along line 4C—4C of FIG. 4A.

FIG. 5A is a plan view of a 3/16 inch pilot drill bit having a coupon catch design and useful in the apparatus according to the present invention. FIG. 5B is an end view of the pilot bit shown in FIG. 5A taken along line 5B—5B of FIG. 5A. FIG. 6 is a plan view of the pilot bit shown in FIGS. 5A and 5B and shows the various dimensions of the pilot bit. In FIGS. 5A, 5B and 6, all dimensions shown are in inches with the exception of angles shown in degrees (°). The numerals shown are dimensions with the exception of the designation for line 5B—5B and reference numerals 110 and 111. Reference numeral 110 designates a ¼–20 H3 spiral flute plug chamfer on the pilot bit and 111 designates a #7 wire, 118° split point on the pilot bit. The material of the bit is preferably a high speed tool steel. Unless otherwise shown, all radii are 0.015 inch.

FIG. 7A is a plan view of a ½ inch twist drill bit shown in partial cutaway and suitable for use in an apparatus according to the present invention. FIG. 7B is an end view of the twist drill bit shown in FIG. 7A taken along line 7B—7B of FIG. 7A. FIG. 7C is an end view of the twist drill bit of FIG. 7A, taken along line 7C—7C in FIG. 7A. In FIGS. 7A, 7B and 7C, all dimensions shown are in inches with the exception of angles shown in degrees (°). The numerals shown are dimensions with the exception of the designation for lines 7B—7B and 7C—7C, and reference numerals 113 and 114. Reference numeral 113 designates a ½ inch twist drill with a 118° point and 114 designates a flatly ground surface, three of which are equally spaced around the circumference of the shaft. The material of the bit is preferably a high speed tool steel. Unless otherwise shown, all radii are 0.06 inch.

FIG. 8A is a ⅝ inch twist drill bit shown in breakaway view, that can be used in an apparatus according to an embodiment of the present invention. FIG. 8B is an end view of the twist drill bit of FIG. 8A taken along line 8B—8B of FIG. 8A. FIG. 8C is an end view taken along line 8C—8C of FIG. 8A. In FIGS. 8A, 8B and 8C, all dimensions shown are in inches with the exception of angles shown in degrees (°). The numerals shown are dimensions with the exception of the designation for lines 8B—8B and 8C—8C, and reference numerals 115 and 116. Reference numeral 115 designates a ⅝ inch twist drill with a 118° point and 116 designates a flatly ground surface, three of which are equally spaced around the circumference of the shaft. The material of the bit is preferably a high speed tool steel. Unless otherwise shown, all radii are 0.06 inch.

FIG. 9 is a plan view of a tap kit according to an embodiment of the present invention. The kit includes a 13/16 inch cutting bit 120, a ½ inch twist drill bit 121, a ⅝ inch twist drill bit 122, a ¾ inch BSPT connector 123, a 1 inch BSPT connector 124, a tapping tool 125 including a 1 and 7/16 inch cutting bit, and a carrying case 126.

FIG. 10 is a plan view of a tap kit according to an embodiment of the present invention. The kit includes a 13/16 inch cutting bit 130, a ½ inch twist drill bit 131, a ⅝ inch twist drill bit 132, a ¾ inch NPT connector 133, a 1 inch NPT connector 134, a tapping tool 135 including a 1 and 7/16 inch cutting bit, and a carrying case 136.

Figure 11:
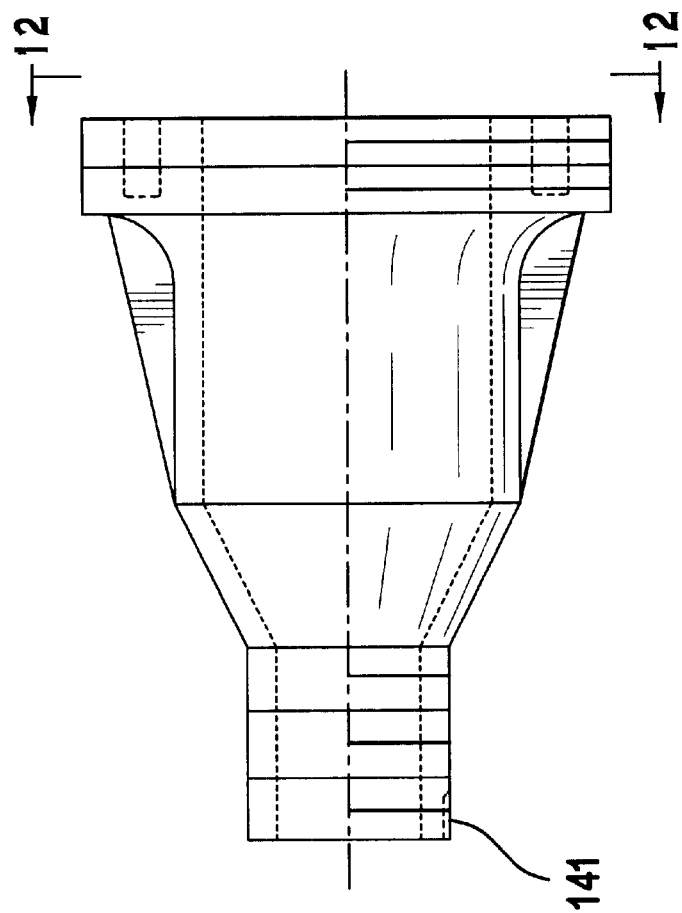
FIG. 11 is a side plan view of a ¾ inch NPT connector according to an embodiment of the present invention.
Figure 12:
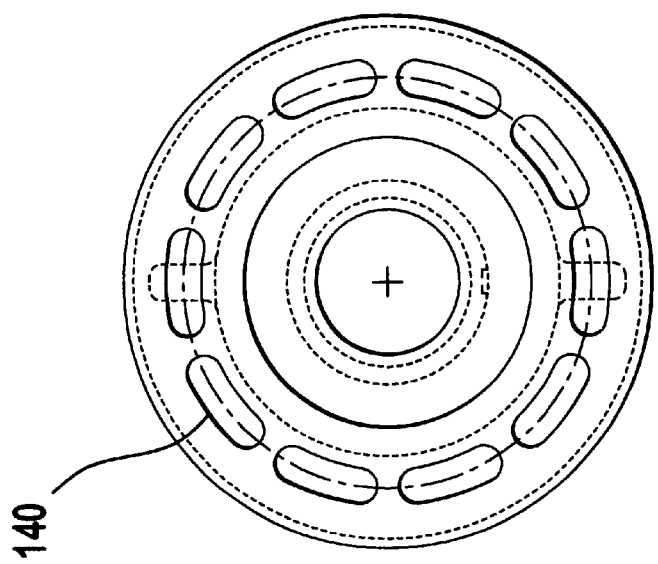
FIG. 12 is an end view of the connector taken along line 12—12 of FIG. 11.

FIG. 11 is a side plan view of a ¾ inch NPT connector according to an embodiment of the present invention and FIG. 12 is an end view of the connector taken along line 12—12 of FIG. 11. The connector is preferably made of a 300 series stainless steel material. All dimensions shown are in inches with the exception of angles shown in degrees (°). The numerals shown are dimensions with the exception of the designation for line 12—12, and reference numerals 140 and 141. Reference numeral 140 designates a slot having a 2.31 inch outer diameter and a 0.41 inch deep from the back side, and having a typical radius of 0.094 inch. Reference numeral 141 represents a ⅛ inch wide ground pressure relief slot. Unless otherwise designated, the radii are 0.063 inch. The minimum tube wall thickness is 0.13 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 13:
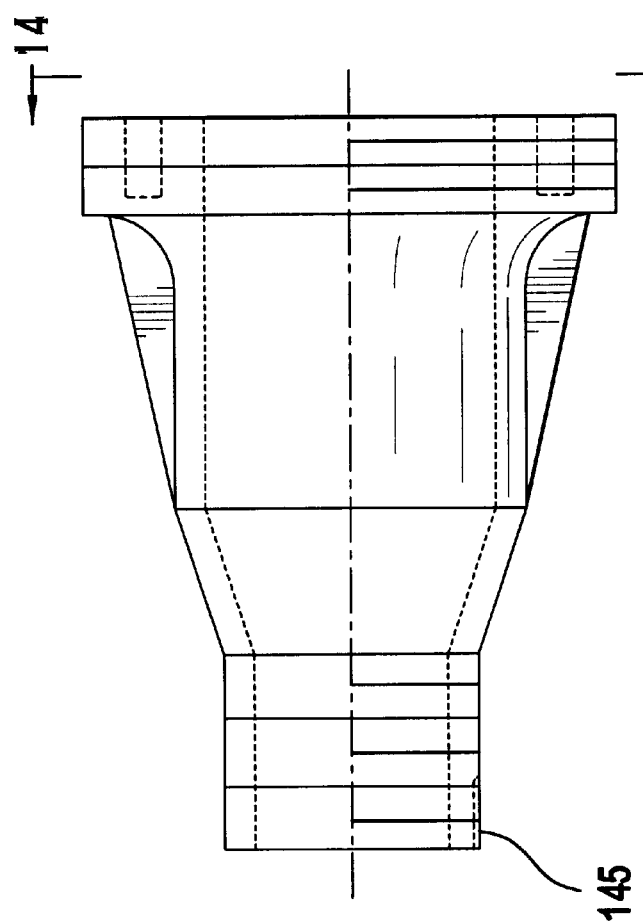
FIG. 13 is a side plan view of a 1 inch NPT connector according to an embodiment of the present invention.
Figure 14:
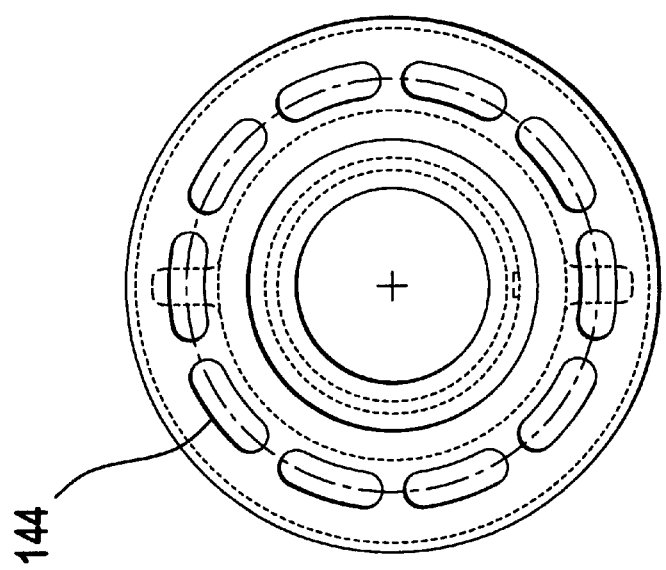
FIG. 14 is an end view of the connector taken along line 14—14 of FIG. 13.

FIG. 13 is a side plan view of a 1 inch NPT connector according to an embodiment of the present invention and FIG. 14 is an end view of the connector taken along line 14—14 of FIG. 13. The connector is preferably made of a 300 series stainless steel material. All dimensions shown are in inches with the exception of angles shown in degrees (°). The numerals shown are dimensions with the exception of the designation for line 14—14, and reference numerals 144 and 145. Reference numeral 144 designates a slot having a 2.31 inch outer diameter and a 0.41 inch deep from the back side, and having a typical radius of 0.094 inch. Reference numeral 145 represents a ⅛ inch wide ground pressure relief slot. Unless otherwise designated, the radii are 0.063 inch. The minimum tube wall thickness is 0.15 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 17:
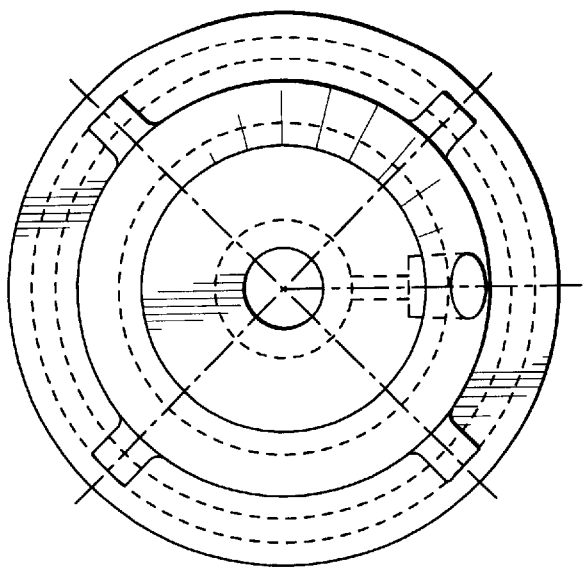
FIG. 17 is an end view taken along line 17—17 of FIG. 15.
Figure 15:
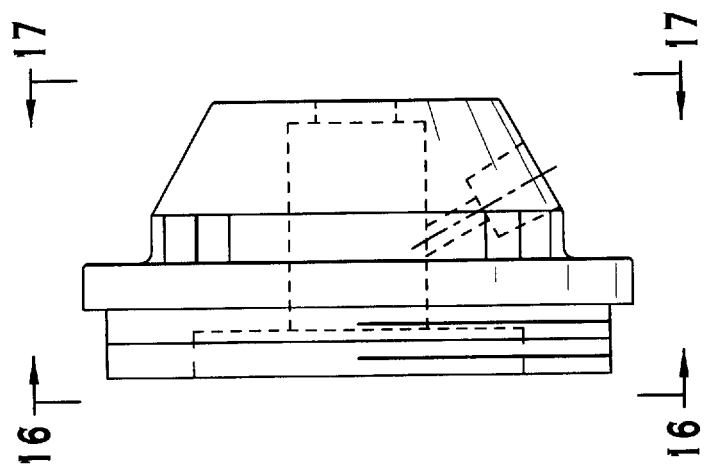
FIG. 15 is a side view of an end cap used in an apparatus according to an embodiment of the present invention.
Figure 16:
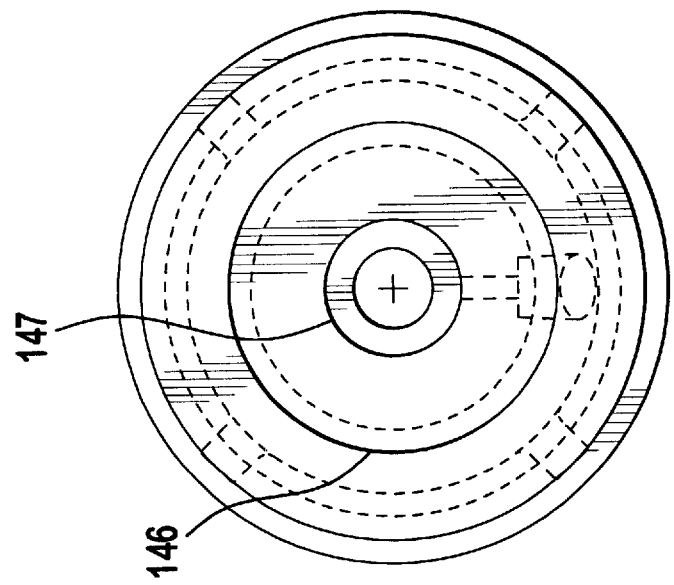
FIG. 16 is an end view taken along line 16—16 of FIG. 15.

FIG. 15 is a side view of an end cap used in an apparatus according to an embodiment of the present invention. FIG. 16 is an end view taken along line 16—16 of FIG. 15. FIG. 17 is an end view taken along line 17—17 of FIG. 15. The end cap is preferably made of a 300 series stainless steel material. All dimensions shown are in inches with the exception of angles shown in degrees (°). The numerals shown are dimensions with the exception of the designations for lines 16—16 and 17—17, and reference numerals 146 and 147. Reference numeral 146 designates a bore having a diameter of 1.80 inches that is 0.25 inch deep. Reference numeral 147 represents a bore having a diameter of 0.745/0.750 inch that is 1.13 inches deep from the bottom of a 1.80 inch diameter bore. Unless otherwise designated, the radii are 0.063 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 18:
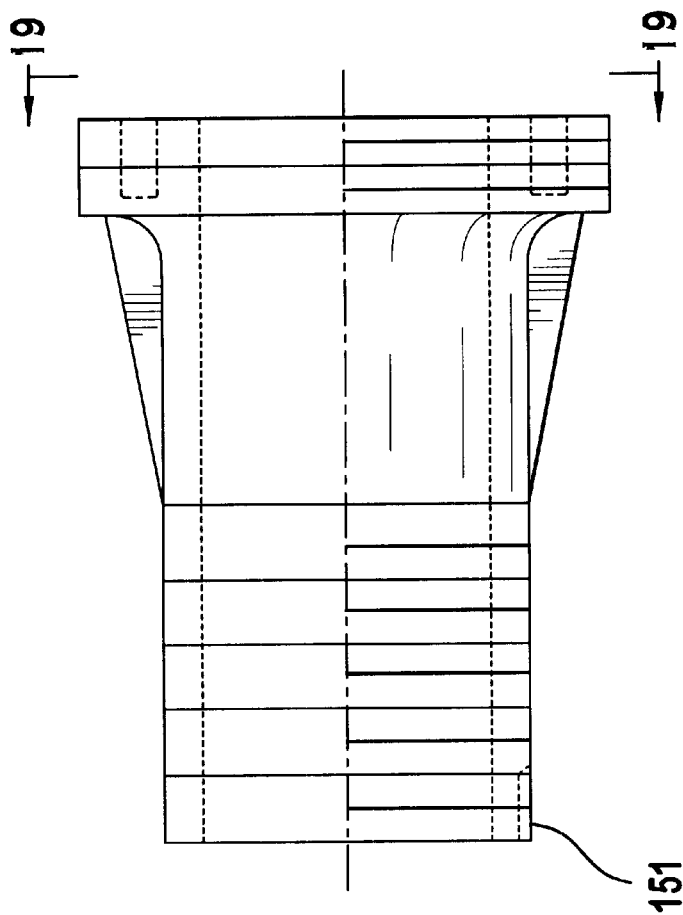
FIG. 18 is a side plan view of a 1 and ½ inch NPT connector used in an apparatus according to an embodiment of the present invention.
Figure 19:
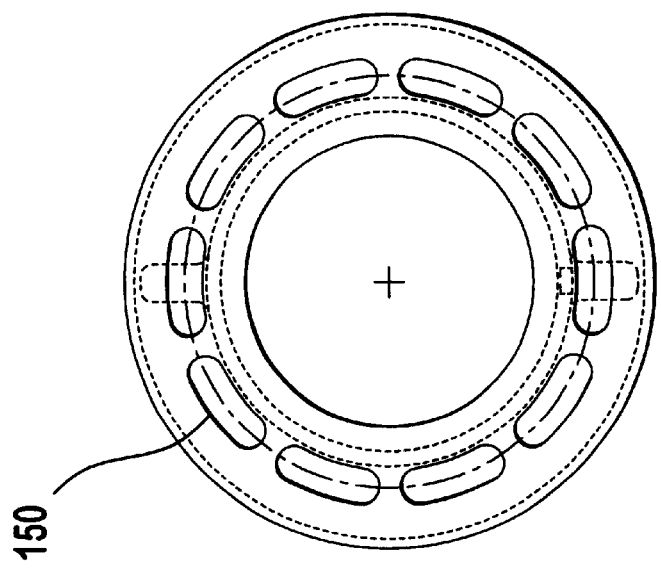
FIG. 19 is an end view of the connector taken along line 19—19 of FIG. 18.

FIG. 18 is a side plan view of a 1½ inch NPT connector used in an apparatus according to an embodiment of the present invention. FIG. 19 is an end view of the connector taken along line 19—19 of FIG. 18. The connector is preferably made of a 300 series stainless steel material. All dimensions shown are in inches with the exception of angles shown in degrees (°). The numerals shown are dimensions with the exception of the designation for line 19—19, and reference numerals 150 and 151. Reference numeral 150 designates a slot having a 2.31 inch outer diameter and a 0.41 inch deep from the back side, and having a typical radius of 0.094 inch. Reference numeral 151 represents a ⅛ inch wide ground pressure relief slot. Unless otherwise designated, the radii are 0.063 inch. The minimum tube wall thickness is 0.20 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 20:
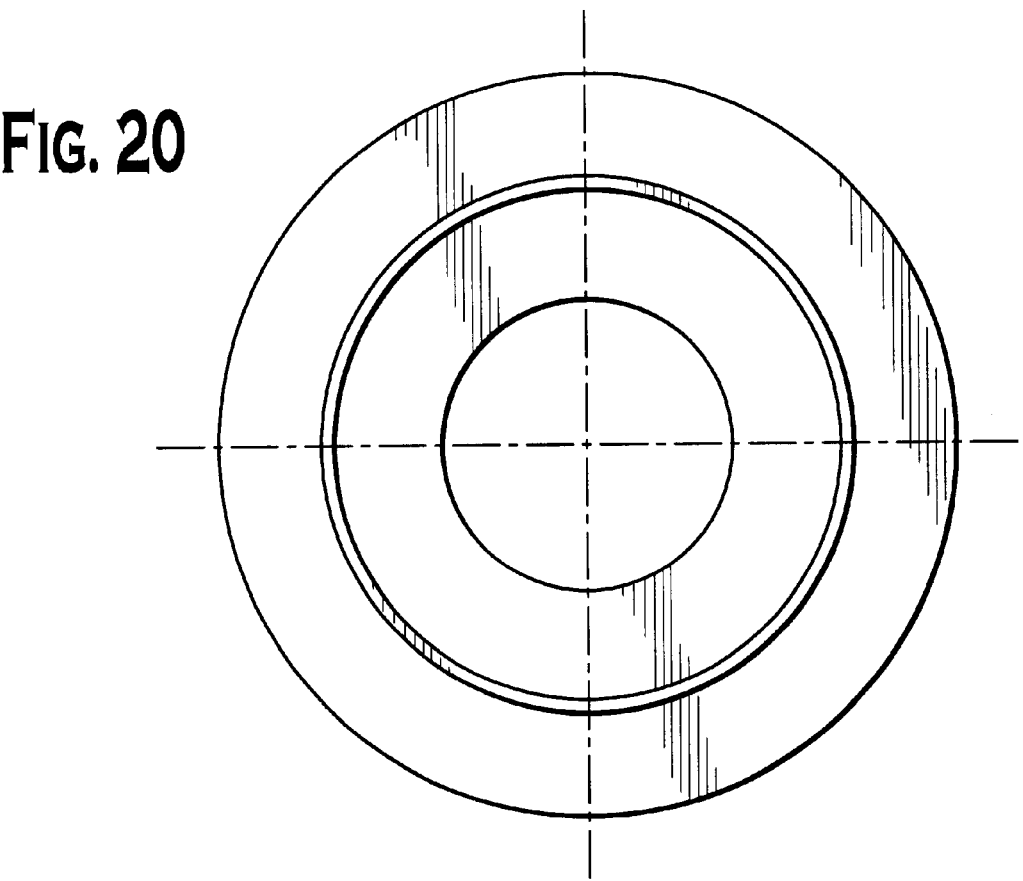
FIG. 20 is an end view of a filter used in an apparatus according to an embodiment of the present invention.
Figure 21:
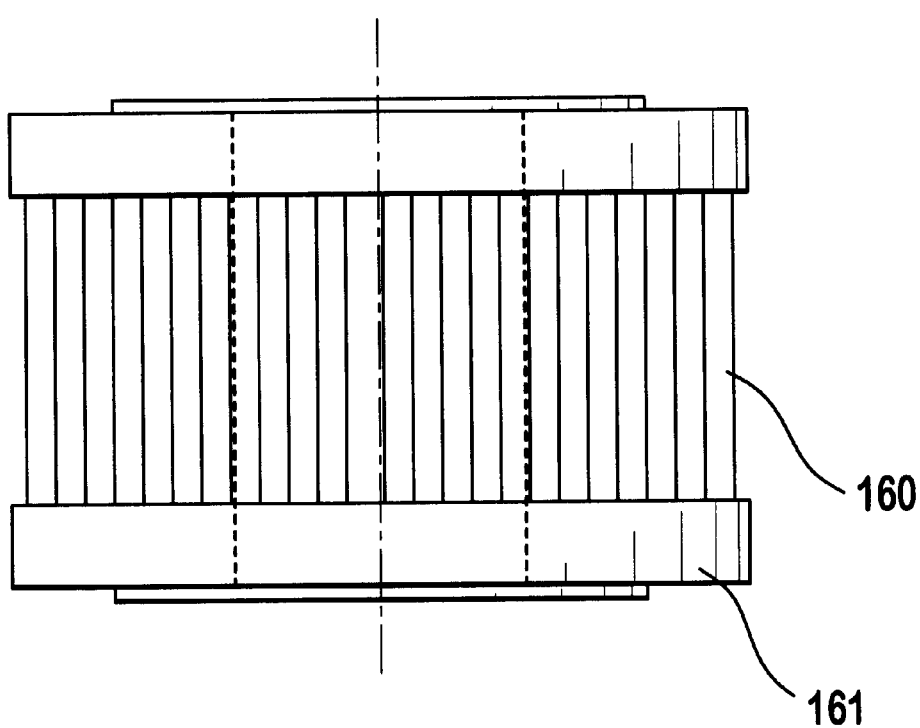
FIG. 21 is a side view of the pleated filter of FIG. 20.

FIG. 20 is an end view of a filter used in an apparatus according to an embodiment of the present invention and FIG. 21 is a side view of the pleated filter of FIG. 20. The filter is preferably rated for a flow rate of 30 cubic feet per minute (cfm). Reference numeral 160 designates a resin coated industrial strength paper media having a 10 micron pore size. Numeral 161 designates a black plastisol seal that exists at both ends of the filter.

Figure 22:
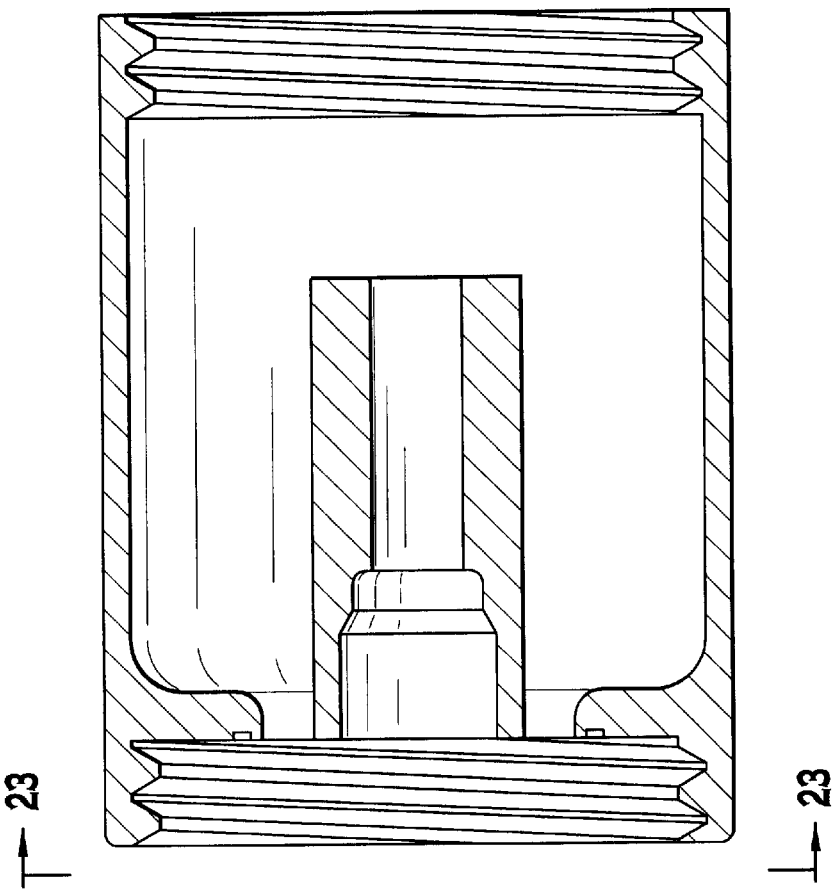
FIG. 22 is a cutaway side view of a tap body of an apparatus according to an embodiment of the present invention.
Figure 23:
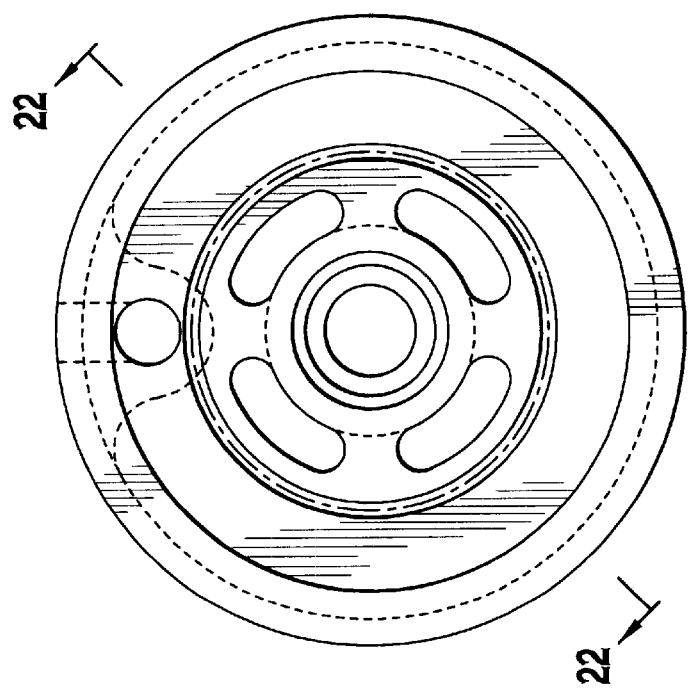
FIG. 23 is an end view taken along line 23—23 of FIG. 22.

FIG. 22 is a cut away side view of a tap body of an apparatus according to an embodiment of the present invention taken along line 22—22 of FIG. 23, and FIG. 23 is an end view taken along line 23—23 of FIG. 22. The material of the tap body is preferably a 300 series stainless steel. All dimensions shown are in inches with the exception of angles shown in degrees (°). The numerals shown are dimensions with the exception of the designation for lines 22—22 and 23—23. Unless otherwise designated, the radii are 0.063 inch. The preferred minimum tube wall thickness is 0.20 inch. The connector is an investment cast piece, solution annealed, machine threaded, and cast to have a gray glass bead finish. Numbers preceded by an "R" are radii. The 2 and ¾ inch by 12 threads at both ends of the body are unified threads of the 2B type. Numbers followed by the designation "DP" are depth dimensions.

Figure 24:
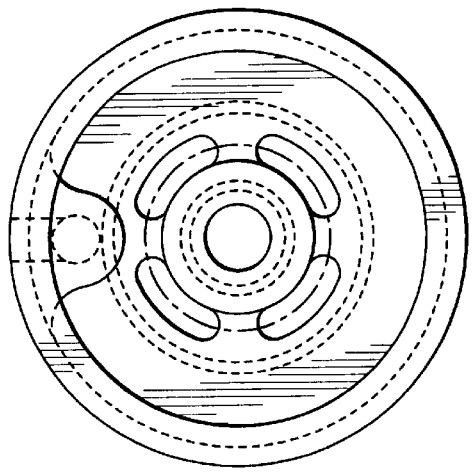
FIGS. 24–26 show various end views and a side phantom view of a tap body useful in an apparatus according to an embodiment of the present invention.
Figure 26:
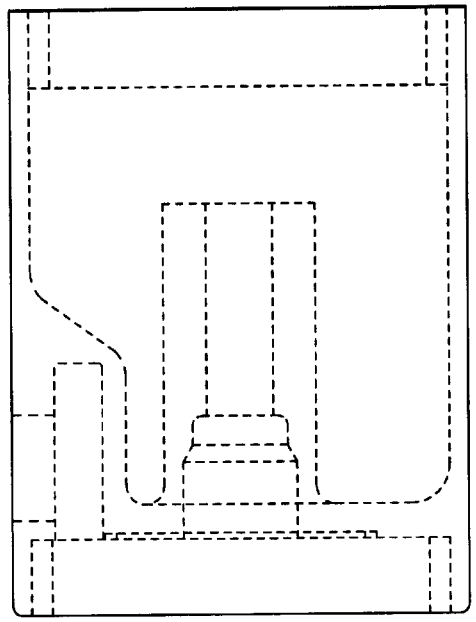
Figure 25:
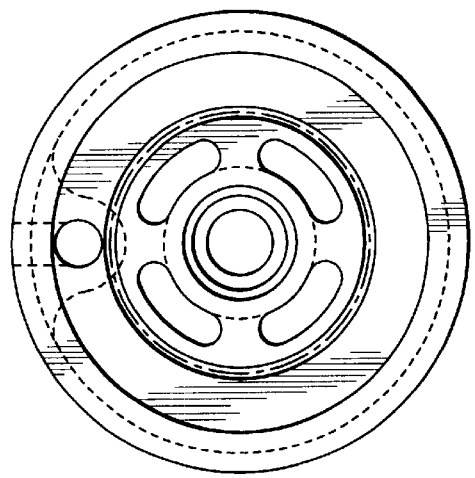

FIGS. 24—26 show various end views and a side phantom view of a tap body useful in an apparatus according to an embodiment of the present invention. All dimensions shown are in inches with the exception of angles shown in degrees (°). The numerals shown are dimensions. Unless otherwise designated, the radii are 0.063 inch. The connector is an investment cast piece, solution annealed, machine threaded, and cast to have a gray glass bead finish. Numbers preceded by an "R" are radii.

FIG. 27 is a plan view of a drill bit including a cutting bit without a pilot bit, shown in breakaway view, useful in an apparatus according to an embodiment of the present invention. FIG. 28 is an end view taken along line 28—28 of FIG. 27. FIG. 29 is an end view taken along line 29—29 of FIG. 27. All dimensions shown are in inches with the exception of angles shown in degrees (°). The numerals shown are dimensions with the exception of the designation for lines 28—28 and 29—29, and reference numerals 170 and 171. Reference numeral 170 designates a unibit carbide cutter having a ¾ inch diameter. Numeral 171 designates a flatly ground surface, three of which are equally spaced around the circumference of the shaft. The material of the bit is preferably a 1035 or 1045 grade steel. Unless otherwise shown, all radii are 0.06 inch.

FIG. 30 is a plan view of a drill bit including a cutting bit without a pilot bit, shown in breakaway view, useful in an apparatus according to an embodiment of the present invention. FIG. 31 is an end view taken along line 31—31 of FIG. 30. FIG. 32 is an end view taken along line 32—32 of FIG. 30. All dimensions shown are in inches with the exception of angles shown in degrees (°). The numerals shown are dimensions with the exception of the designation for lines 31—31 and 32—32, and reference numerals 180 and 181. Reference numeral 180 designates a unibit carbide cutter having a 1 and 7/16 inch diameter. Numeral 181 designates a flatly ground surface, three of which are equally spaced around the circumference of the shaft. The material of the bit is preferably a 1035 or 1045 grade steel. Unless otherwise shown, all radii are 0.06 inch.

Figure 33:
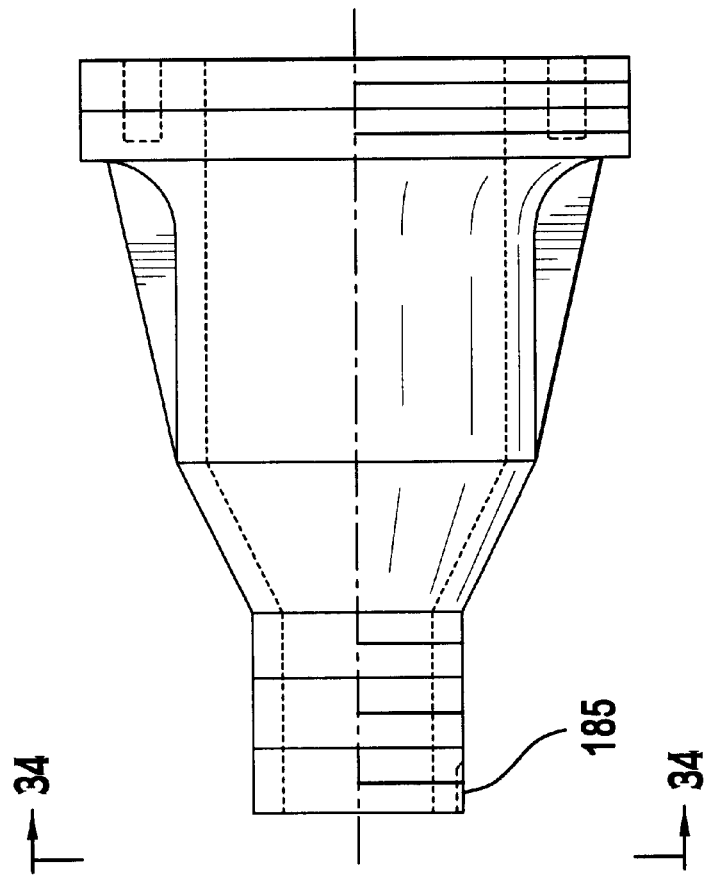
FIG. 33 is a side plan view of a ¾ inch connector used in an apparatus according to an embodiment of the present invention.
Figure 34:
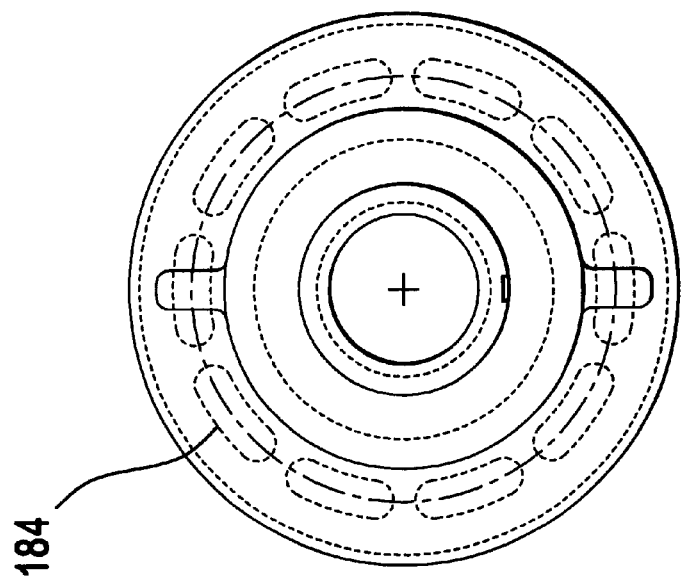
FIG. 34 is an end view of the connector taken along line 34—34 of FIG. 33.

FIG. 33 is a side plan view of a ¾ inch connector used in an apparatus according to an embodiment of the present invention. FIG. 34 is an end view of the connector taken along line 34—34 of FIG. 33. The connector is preferably made of a 300 series stainless steel material. All dimensions shown are in inches with the exception of angles shown in degrees (°). The numerals shown are dimensions with the exception of the designation for line 34—34, and reference numerals 184 and 185. Reference numeral 184 designates a slot having a 2.31 inch outer diameter and a 0.41 inch deep from the back side, and having a typical radius of 0.094 inch. Reference numeral 185 represents a ⅛ inch wide ground pressure relief slot. Unless otherwise designated, the radii are 0.063 inch. The minimum tube wall thickness is 0.13 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 35:
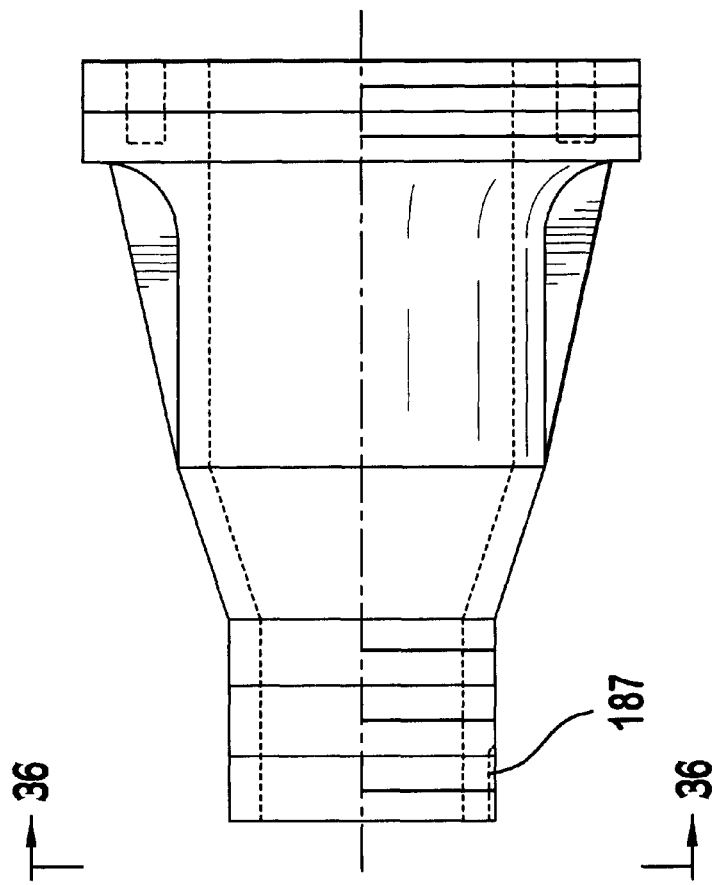
FIG. 35 is a side view of a 1 inch connector used in an apparatus according to an embodiment of the present invention.
Figure 36:
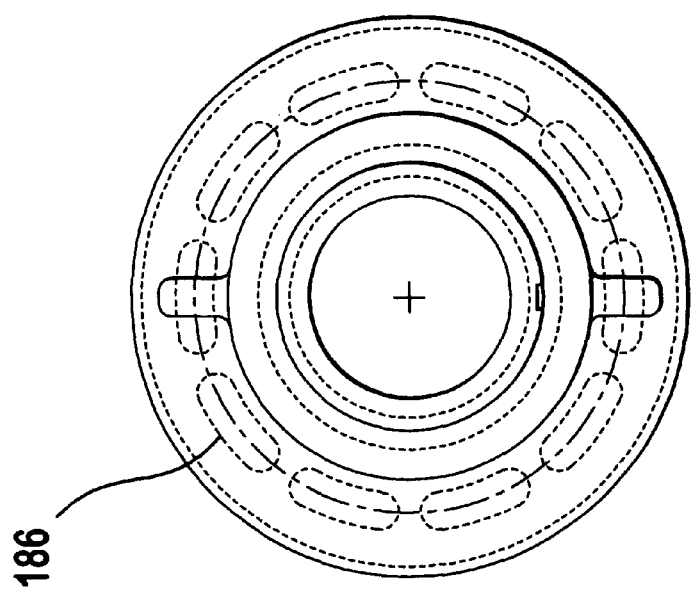
FIG. 36 is an end view of the connector taken along line 36—36 of FIG. 35.

FIG. 35 is a side view of a 1 inch connector used in an apparatus according to an embodiment of the present invention, and FIG. 36 is an end view of the connector taken along line 36—36 of FIG. 35. The connector is preferably made of a 300 series stainless steel material. All dimensions shown are in inches with the exception of angles shown in degrees (°). The numerals shown are dimensions with the exception of the designation for line 36—36, and reference numerals 186 and 187. Reference numeral 186 designates a slot having a 2.31 inch outer diameter and a 0.41 inch deep from the back side, and having a typical radius of 0.094 inch. Reference numeral 187 represents a ⅛ inch wide ground pressure relief slot. Unless otherwise designated, the radii are 0.063 inch. The minimum tube wall thickness is 0.15 inch. The connector is an investment cast piece, solution annealed, machine threaded, and cast to have a gray glass bead finish. Numbers preceded by an "R" are radii. The 2 and ¾ inch by 12 threads are unified threads of the 2A type.

Figure 37:
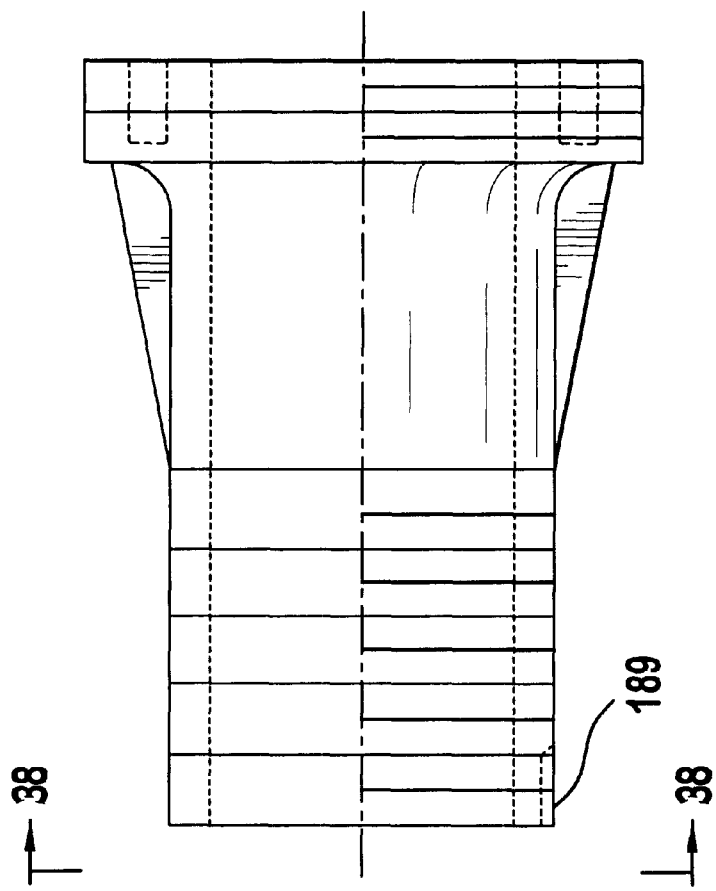
FIG. 37 is a side view of a 1 and ½ inch connector used in an apparatus according to an embodiment of the present invention.
Figure 38:
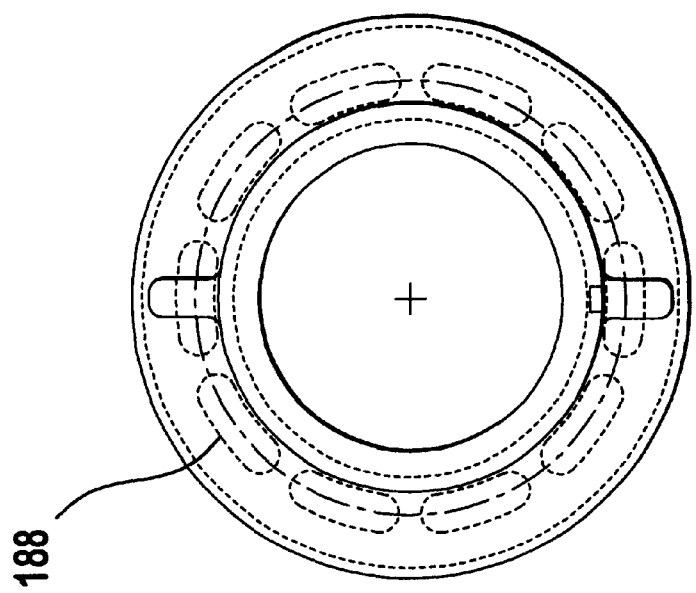
FIG. 38 is an end view of the connector taken along line 38—38 of FIG. 37.

FIG. 37 is a side view of a 1½ inch connector used in an apparatus according to an embodiment of the present invention, and FIG. 38 is an end view of the connector taken along line 38—38 of FIG. 37. The connector is preferably made of a 300 series stainless steel material. All dimensions shown are in inches with the exception of angles shown in degrees (°). The numerals shown are dimensions with the exception of the designation for line 38—38, and reference numerals 188 and 189. Reference numeral 188 designates a slot having a 2.31 inch outer diameter and a 0.41 inch deep from the back side, and having a typical radius of 0.094 inch. Reference numeral 189 represents a ⅛ inch wide ground pressure relief slot. Unless otherwise designated, the radii are 0.063 inch. The minimum tube wall thickness is 0.20 inch. The connector is an investment cast piece, solution annealed, machine threaded, and cast to have a gray glass bead finish. Numbers preceded by an "R" are radii. The 2 and ¾ inch by 12 threads are unified threads of the 2A type.

The tapping tool of the present invention provides flexibility, long-life, and reliable operation, with only minimal maintenance requirements. The tool preferably is made of a strong stainless steel body with interchangeable stainless steel and high speed tool steel components that can be changed in a matter of seconds.

It will be apparent to those skilled in the art that various modifications and variations can be made to the embodiments of the present invention without departing from the spirit or scope of the present invention. Thus, it is intended that the present invention covers other modifications and variations of this invention within the scope of the appended claims and their equivalents.

What is claimed is:

1. A tapping tool for tapping a pressurized fluid from a pressurized fluid conduit, said tapping tool comprising:

a tool body having opposing ends, an opening at one of said ends, an interior cavity, and at least one shaft mount for rotatably mounting a drill bit shaft in a fixed axis of rotation with respect to said tool body while allowing sliding movement of the drill bit shaft along the axis of rotation;

an exhaust port for providing fluid flow communication out of the interior cavity of said tool body such that a continuous fluid flow path is defined between a cutting area and an atmosphere of lower pressure; and a first drill bit having a drill bit shaft and a cutting bit at one end of said shaft, said drill bit shaft having a diameter such that the shaft fits in said at least one shaft mount for rotation about said fixed axis of rotation, said drill bit shaft having a length sufficient to allow said cutting bit to extend through said opening to the cutting area and remain mounted by said at least one shaft mount when said first drill bit is operatively positioned within said tool body, wherein, upon initial piercing of the conduit, a fluid stream of pressurized fluid from the conduit flows along the continuous flow path and out the exhaust port.

2. The tapping tool of claim 1, further comprising a drill connected to an end of said drill bit shaft opposite the end of the shaft having the cutting bit.

3. The tapping tool of claim 1, further comprising a first connector, said first connector having an interior cavity and opposing ends, one end of said first connector having a connection device for connecting to the end of said tool body having said opening, and the opposite end of the first connector having a connection device for connecting to an end of a flow valve.

4. The tapping tool of claim 3, wherein said first connector is connected to said tool body and said drill bit shaft has a length sufficient to allow said cutting bit to extend through said first connector and remain mounted by said at least one shaft mount when said drill bit is operatively positioned within said tool body.

5. The tapping tool of claim 4, wherein said drill bit is operatively positioned in said tool body, said cutting bit extends through said first connector, and said drill bit shaft is mounted by said shaft mount for rotation about said fixed axis of rotation.

6. The tapping tool of claim 5, further comprising a drill connected to an end of said drill bit shaft opposite the end of the shaft having the cutting bit.

7. A tool kit comprising the tapping tool of claim 3 and at least a second connector that is the same or different than said first drill bit.

8. The tapping tool of claim 1, further comprising a flow valve removably connected to the end of said tool body having said opening, and a connection plate connected to said flow valve for mounting said flow valve to a conduit of a pressurized fluid system, and wherein said cutting bit extends through said flow valve and through said connection plate and is mounted by said shaft mount for rotation about said fixed axis of rotation.

9. The tapping tool of claim 8, wherein said connection plate is mounted to a conduit of a pressurized fluid system.

10. The tapping tool of claim 8, wherein said flow valve is removably connected to a first connector at a first end of the first connector, said first connector having an interior cavity, and wherein a second, opposing end of the first connector is connected to the end of the tool body having said opening.

11. The tapping tool of claim 10, further comprising a drill connected to an end of said drill bit shaft opposite the end of the shaft having the cutting bit, and wherein when said drill is actuated the drill bit shaft can be slid through said shaft mount such that the cutting bit extends through said first connector, through said flow valve, through said connection plate, and into contact with said conduit to cut a coupon out of said conduit, and wherein when said cutting bit pierces the conduit, pressurized fluid from said conduit flows through said connection plate, through said flow valve, through said first connector, through the interior cavity of said tool body, and out the exhaust port.

12. The tapping tool of claim 1, wherein said exhaust port is formed in said tool body, wherein said interior cavity is substantially air-tight from said cutting area to said exhaust port, and wherein said tapping tool further comprises a filter positioned within said interior cavity between the opening and the exhaust port of the tool body, such that said filter is adapted to substantially prevent debris and cuttings from a cutting operation from passing out of said tool body while allowing pressurized fluid flowing through said tool body to flow out of said exhaust port.

13. The tapping tool of claim 1, wherein said tool body comprises two or more shaft mounts for rotatably mounting a drill bit shaft in a fixed axis of rotation with respect to said tool body while allowing sliding movement of the drill bit shaft along the axis of rotation.

14. The tapping tool of claim 1, wherein said first drill bit further comprises a pilot bit at the end of said drill bit shaft having said cutting bit, said pilot bit having a smaller diameter than said cutting bit, extending from said cutting bit, and rotating about said fixed axis of rotation, said pilot bit further comprising a catch that retains a coupon cut from a conduit with said cutting bit.

15. A tool kit comprising the tapping tool of claim 1 and at least a second drill bit that is the same or different than said first drill bit.

16. A method for tapping a pressurized fluid from a pressurized fluid conduit, said method comprising:
   mounting a first end of a flow valve to a pressurized fluid conduit, said flow valve having said first end, a second end, and a through hole extending from said first end to said second end when said valve is in an open position;
   actuating said flow valve to an open position if it is not mounted in an open position;
   providing a tapping tool, said tapping tool comprising
      a tool body having opposing ends, a first opening at one of said ends and a second opening at the opposite end, an interior cavity, and at least one shaft mount for rotatably mounting a drill bit shaft in a fixed axis of rotation with respect to said tool body while allowing sliding movement of the drill bit shaft along the axis of rotation,
      an exhaust port for providing fluid flow communication out of the interior cavity of said tool body such that a continuous fluid flow path is defined between a cutting area and an atmosphere of lower pressure; and
      a first drill bit having a drill bit shaft, a cutting bit at one end of said shaft, and a driving head at an opposite end of said shaft, said drill bit shaft being rotatably mounted in said at least one shaft mount and having a diameter such that the shaft fits in said at least one shaft mount for rotation about said fixed axis of rotation, said drill bit shaft having a sufficient length such that said cutting bit extends through said first opening and said driving head extends through said second opening;
   removably connecting said tapping tool, at said end of the tool body having the first opening, to said second end of said flow valve;
   connecting a drill to the driving head of said drill bit shaft;
   extending the cutting bit through said flow valve and into cutting contact with said conduit at said cutting area;
   cutting a hole in said conduit with said cutting bit by actuating said drill, such that, upon initial piercing of the conduit, a fluid stream of pressurized fluid from the conduit flows along the continuous flow path and out the exhaust port; and
   withdrawing the cutting bit from the flow valve.

17. The method of claim 16, further comprising closing said flow valve after said withdrawing, and disconnecting said tapping tool from the second end of said flow valve.

18. The method of claim 17, wherein said mounting comprises mounting a connection plate to said conduit and mounting said first end of said flow valve to said connection plate.

19. The method of claim 16, wherein said tapping tool further comprises a first connector, said first connector having an interior cavity and opposing ends, one end of said first connector being connected to the end of said tool body having said first opening, and the opposite end of the first connector being connected to the second end of said flow valve, and wherein said extending further comprises extending said cutting bit through said first connector.

20. The method of claim 16, wherein said first drill bit further comprises a pilot bit at the end of said drill bit shaft having said cutting bit, said pilot bit having a smaller diameter than said cutting bit, extending from said cutting bit, and rotating about said fixed axis of rotation, and said cutting comprises first cutting a pilot hole with said pilot bit and then cutting a coupon with said cutting bit, and wherein said pilot bit includes a catch that retains said coupon after it is cut with said cutting bit and during withdrawal of the cutting bit from the flow valve.

21. The method of claim 16, wherein pressurized fluid from said pressurized fluid conduit forces debris and cuttings from the cutting operation through the flow valve and into the interior cavity of said tool body.

22. The method of claim 21, wherein said exhaust port is formed in said tool body, wherein said interior cavity is substantially air-tight from said cutting area to said exhaust port, and wherein said tapping tool further comprises a filter positioned within said interior cavity between the first opening and the exhaust port of the tool body, such that said filter is adapted to substantially prevent the debris and cuttings from passing out of said tool body while allowing pressurized fluid flowing through said tool body to flow out of said exhaust port.

23. The method of claim 16, wherein said tool body further comprises at least a second shaft mount at or adjacent said second opening for mounting said drill bit shaft for rotation about said fixed axis of rotation and for sealing said second opening with the drill bit shaft passing therethrough.

24. A tapping tool for tapping a pressurized fluid from a pressurized fluid conduit, said tapping tool comprising:
a tool body having opposing ends, an opening at one of said ends, an interior cavity, and at least one shaft mounting means for rotatably mounting a shaft of a hole cutting means in a fixed axis of rotation with respect to said tool body while allowing sliding movement of the shaft of the hole cutting means along the axis of rotation;
exhaust means for providing fluid flow communication out of the interior cavity of said tool body such that a continuous fluid flow path is defined between a cutting area and an atmosphere of lower pressure; and
first hole cutting means having a shaft and a cutting bit at one end of said shaft, said shaft having a diameter such that the shaft fits in said at least one shaft mounting means for rotation about said fixed axis of rotation, said shaft having a length sufficient to allow said cutting bit to extend through said opening to the cutting area and remain mounted by said at least one shaft mounting means when said first hole cutting means is operatively positioned within said tool body, wherein, upon initial piercing of the conduit, a fluid stream of pressurized fluid from the conduit flows along the continuous flow path and out the exhaust means.

25. The tapping tool of claim 24, further comprising driving means connected to an end of said shaft opposite the end of the shaft having the cutting bit.

26. The tapping tool of claim 24, further comprising first connecting means, said first connecting means having an interior cavity and opposing ends, one end of said first connecting means having connection means for connecting to the end of said tool body having said opening, and the opposite end of the first connecting means having a connection means for connecting to an end of a valve means.

27. The tapping tool of claim 26, wherein said first connecting means is connected to said tool body and said shaft has a length sufficient to allow said cutting bit to extend through said first connecting means and remain mounted by said at least one shaft mounting means when said first hole cutting means is operatively positioned within said tool body.

28. The tapping tool of claim 27, wherein said first hole cutting means is operatively positioned in said tool body, said cutting bit extends through said first connecting means, and said shaft is mounted by said shaft mounting means for rotation about said fixed axis of rotation.

29. The tapping tool of claim 28, further comprising a driving means connected to an end of said shaft opposite the end of the shaft having the cutting bit.

30. A tool kit comprising the tapping tool of claim 26 and at least a second connecting means that is the same or different than said first connecting means.

31. The tapping tool of claim 24, further comprising valve means removably connected to the end of said tool body having said opening, and a valve mounting means connected to said valve means for mounting said valve means to a conduit of a pressurized fluid system, and wherein said cutting bit extends through said valve means and through said valve mounting means and is mounted by said shaft mounting means for rotation about said fixed axis of rotation.

32. The tapping tool of claim 31, wherein said valve means is removably connected to a first connecting means at a first end of a first connecting means, said first connecting means having an interior cavity and a second end that opposes said first end, said second end of the connecting means being connected to the end of the tool body having said opening, and said tool further comprises driving means connected to an end of said shaft opposite the end of the shaft having the cutting bit, and wherein when said driving means is actuated the shaft can be slid through said shaft mounting means such that the cutting bit extends through said first connecting means, through said valve means, through said valve mounting means, and into contact with said conduit to cut a coupon out of said conduit, and wherein when said cutting bit pierces the conduit, pressurized fluid from said conduit flows through said valve mounting means, through said valve means, through said first connecting means, through the interior cavity of said tool body, and out the exhaust means.

33. The tapping tool of claim 24, wherein said exhaust means is formed in said tool body, wherein said interior cavity is substantially air-tight from said cutting area to said exhaust means, and wherein said tapping tool further comprises a filter positioned within said interior cavity between the opening and the exhaust means in the tool body, such that said filter is adapted to substantially prevent debris and cuttings from a cutting operation from passing out of said tool body while allowing pressurized fluid flowing through said tool body to flow out of said exhaust means.

34. A tool kit comprising the tapping tool of claim 24 and at least a second hole cutting means that is the same or different than said first hole cutting means.

35. A method for tapping a pressurized fluid from a pressurized fluid conduit, said method comprising:
mounting a first end of a valve means to a pressurized fluid conduit, said valve means having said first end, a second end, and a through hole extending from said first end to said second end when said valve means is in an open position;

actuating said valve means to an open position if it is not mounted in an open position;

providing a tapping tool, said tapping tool comprising
- a tool body having opposing ends, a first opening at one of said ends and a second opening at the opposite end, an interior cavity, and at least one shaft mounting means for rotatably mounting a shaft of a hole cutting means in a fixed axis of rotation with respect to said tool body while allowing sliding movement of the shaft of the hole cutting means along the axis of rotation,
- an exhaust means for providing fluid flow communication out of the interior cavity of said tool body such that a continuous fluid flow path is defined between a cutting area and an atmosphere of lower pressure; and
- a first hole cutting means having a shaft, a cutting bit at one end of said shaft, and a driving head at an opposite end of said shaft, said shaft being rotatably mounted in said at least one shaft mounting means and having a diameter such that the shaft fits in said at least one shaft mounting means for rotation about said fixed axis of rotation, said shaft having a sufficient length such that said cutting bit extends through said first opening and said driving head extends through said second opening;

removably connecting said tapping tool, at said end of the tool body having the first opening, to said second end of said valve means;

connecting a driving means to the driving head of said shaft;

extending the cutting bit through said valve means and into cutting contact with said conduit at said cutting area;

cutting a hole in said conduit with said cutting bit by driving said driving means, such that, upon initial piercing of the conduit, a fluid stream of pressurized fluid from the conduit flows along the continuous flow path and out the exhaust means; and withdrawing the cutting bit from the valve means.

36. The method of claim 35, further comprising closing said valve means after said withdrawing, and disconnecting said tapping tool from the second end of said valve means.

37. The method of claim 35, wherein said mounting comprises mounting a first connecting means to said conduit and mounting said first end of said valve means to said first connecting means.

38. The method of claim 35, wherein said tapping tool further comprises a connection means, said connection means having an interior cavity and opposing ends, one end of said connection means being connected to the end of said tool body having said first opening, and the opposite end of the connection means being connected to the second end of said valve means, and wherein said extending further comprises extending said cutting bit through said connection means.

39. The method of claim 35, wherein said first hole cutting means further comprises a pilot bit at the end of said shaft having said cutting bit, said pilot bit having a smaller diameter than said cutting bit, extending from said cutting bit, and rotating about said fixed axis of rotation, and said cutting comprises first cutting a pilot hole with said pilot bit and then cutting a coupon with said cutting bit, and wherein said pilot bit includes a catch that retains said coupon after it is cut with said cutting bit and during withdrawal of the cutting bit from the valve means.

40. The method of claim 35, wherein pressurized fluid from said pressurized fluid conduit forces debris and cuttings from the cutting operation through the valve means and into the interior cavity of said tool body.

41. The method of claim 35, wherein said exhaust means is formed in said tool body, wherein said interior cavity is substantially air-tight from said cutting area to said exhaust means, and wherein said tapping tool further comprises a filter positioned within said interior cavity between the first opening and the exhaust means in the tool body, such that said filter is adapted to substantially prevent debris and cuttings from the cutting operation from passing out of said tool body while allowing pressurized fluid flowing through said tool body to flow out of said exhaust means.

42. The method of claim 35, wherein said tool body further comprises at least a second shaft mounting means at or adjacent said second opening for mounting said shaft for rotation about said fixed axis of rotation and for sealing said second opening with the shaft passing therethrough.

* * * * *